United States Patent
Hao et al.

(10) Patent No.: US 10,708,937 B2
(45) Date of Patent: Jul. 7, 2020

(54) CONFIGURATION METHOD FOR RESOURCE SHARING AMONG MULTIPLE WIRELESS LINKS, SIGNAL TRANSMISSION METHOD AND NODE

(71) Applicant: ZTE Corporation, Shenzhen (CN)

(72) Inventors: Peng Hao, Shenzhen (CN); Jian Li, Shenzhen (CN); Feng Bi, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 58 days.

(21) Appl. No.: 15/577,853

(22) PCT Filed: Mar. 14, 2016

(86) PCT No.: PCT/CN2016/076280
§ 371 (c)(1),
(2) Date: Nov. 29, 2017

(87) PCT Pub. No.: WO2016/192433
PCT Pub. Date: Dec. 8, 2016

(65) Prior Publication Data
US 2018/0167961 A1    Jun. 14, 2018

(30) Foreign Application Priority Data
May 29, 2015 (CN) .......................... 2015 1 0288542

(51) Int. Cl.
*H04W 72/12* (2009.01)
*H04W 72/04* (2009.01)
(Continued)

(52) U.S. Cl.
CPC ....... *H04W 72/1263* (2013.01); *H04L 5/0037* (2013.01); *H04L 5/0053* (2013.01);
(Continued)

(58) Field of Classification Search
None
See application file for complete search history.

(56) References Cited

U.S. PATENT DOCUMENTS

| 2011/0211503 A1* | 9/2011 | Che | .............. H04L 5/0005 |
| | | | 370/280 |
| 2012/0076070 A1* | 3/2012 | Takano | .............. H04L 5/0037 |
| | | | 370/315 |

FOREIGN PATENT DOCUMENTS

| CN | 102123492 A | 7/2011 |
| CN | 102405682 A | 4/2012 |
| (Continued) | | |

OTHER PUBLICATIONS

International Search Report for corresponding application PCT/CN2016/076280 filed Mar. 14, 2016; dated May 31, 2016.
(Continued)

Primary Examiner — Kouroush Mohebbi
(74) Attorney, Agent, or Firm — Cantor Colburn LLP

(57) ABSTRACT

A configuration method for resource sharing among multiple wireless links is provided. The multiple wireless links include a first link and a second link, or include a first link, a second link and a third link. In the method, P-Q configuration is performed on a set N formed by a group of continuous units, and a set P configured for downlink transmission of the second link/third link and a set Q configured for uplink transmission of the second link/third link in the set N are determined; U-V configuration is performed on the set N, and a set U configured for downlink transmission of the first link/third link and a set V configured for uplink transmission of the first link/third link in the set N are determined; and a set S for uplink transmission of the second link/third link and downlink transmission of the second link/third link is determined.

22 Claims, 6 Drawing Sheets

---

110. Perform P-Q configuration on a set N formed by a group of continuous units, and determine a set P configured for downlink transmission of a second link/third link and a set Q configured for uplink transmission of the second link/third link in the set N 120. Perform U-V configuration on the set N, and determine a set U configured for downlink transmission of a first link/third link and a set V configured for uplink transmission of the first link and/or third link in the set N; and determine a set S for uplink transmission of the second link/third link and downlink transmission of the second link/third link

(51) Int. Cl.
*H04L 5/14* (2006.01)
*H04L 5/00* (2006.01)
*H04W 16/10* (2009.01)

(52) U.S. Cl.
CPC ........... *H04L 5/1469* (2013.01); *H04W 72/04* (2013.01); *H04W 72/1205* (2013.01); *H04W 16/10* (2013.01); *H04W 72/0446* (2013.01)

(56) References Cited

FOREIGN PATENT DOCUMENTS

| | | |
|---|---|---|
| CN | 103339982 A | 10/2013 |
| CN | 103875259 A | 6/2014 |
| EP | 2424288 A1 | 2/2012 |
| WO | 2010061053 A1 | 6/2010 |
| WO | 2010079951 A2 | 7/2010 |
| WO | 2010087645 A1 | 8/2010 |
| WO | 2014136928 A1 | 9/2014 |

OTHER PUBLICATIONS

European Search Report for corresponding application EP16802356: Report dated May 23, 2018.
Examination Report for European Application 16 802 356.2; Report dated May 9, 2019.

* cited by examiner

| | Downlink subframe and special subframe of AL | | Control domain of MBSFN subframe, configured for AL | | Uplink subframe of sBL |
| | Uplink subframe of AL | | Data domain of MBSFN subframe, configured for sBL downlink | | |

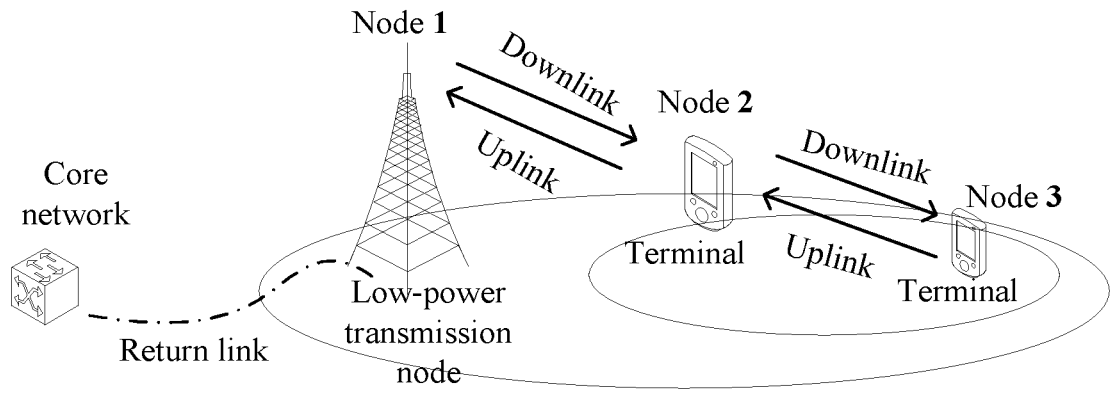
Fig. 3B
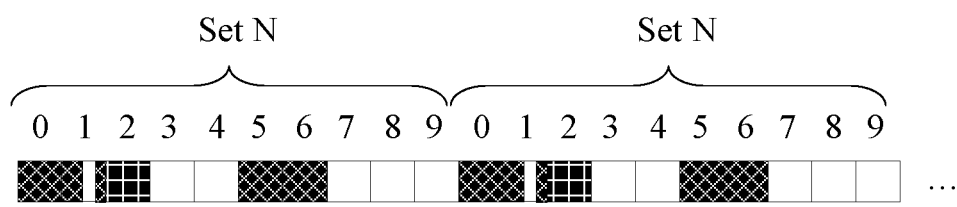
Fig. 4
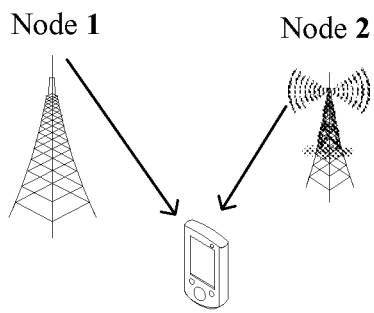
Fig. 5(A)
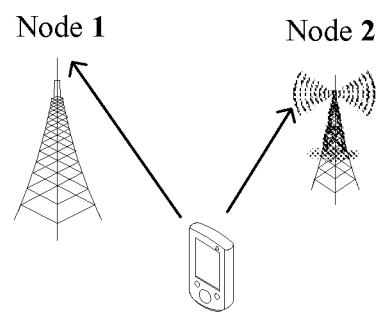
Fig. 5(B)
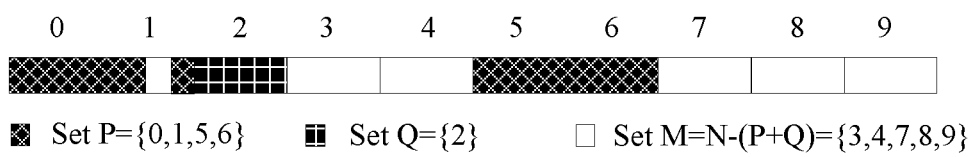
Fig. 5（C）

110. Perform P-Q configuration on a set N formed by a group of continuous units, and determine a set P configured for downlink transmission of a second link/third link and a set Q configured for uplink transmission of the second link/third link in the set N 120. Perform U-V configuration on the set N, and determine a set U configured for downlink transmission of a first link/third link and a set V configured for uplink transmission of the first link and/or third link in the set N; and determine a set S for uplink transmission of the second link/third link and downlink transmission of the second link/third link

Fig. 13

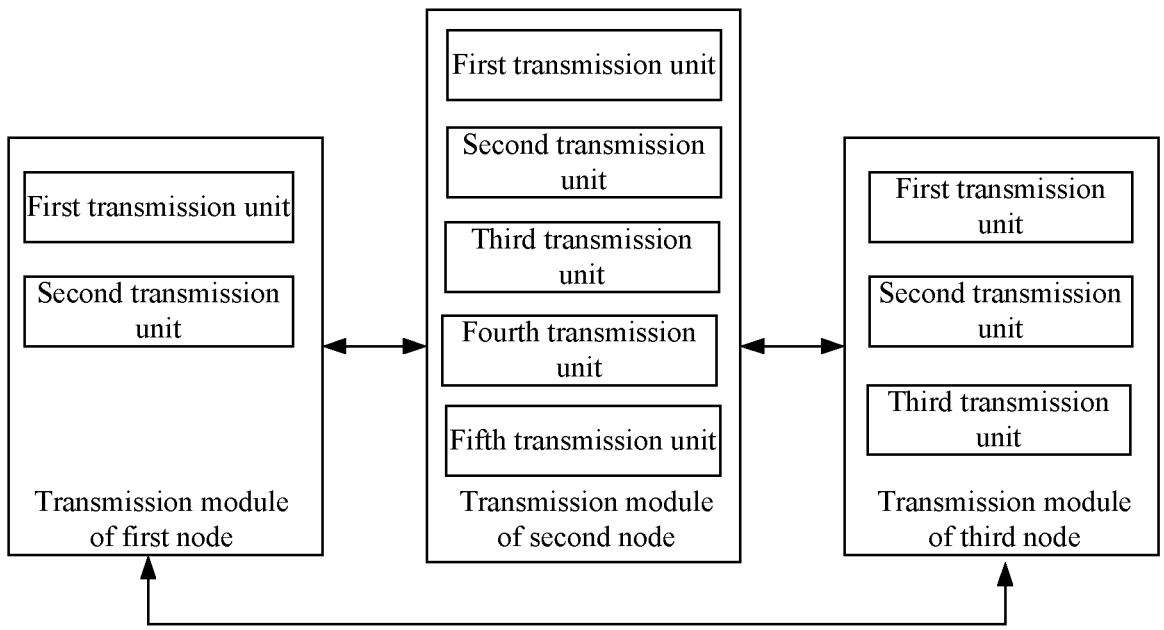

Fig. 14

CONFIGURATION METHOD FOR RESOURCE SHARING AMONG MULTIPLE WIRELESS LINKS, SIGNAL TRANSMISSION METHOD AND NODE

TECHNICAL FIELD

The present disclosure relates to, but not limited to, the field of wireless communications, and particularly to configuration method for resource sharing among multiple wireless links, a signal transmission method and a node.

BACKGROUND

The development history of mobile communication shows that cell splitting, a greater bandwidth and higher spectrum efficiency are three may support of system capacity improvement. Therefore, "cell splitting" may be a key of achieving a capacity increase objective of a 5th-Generation (5G) system.

A 4th-Generation (4G) system may obtain a cell splitting gain through a Heterogeneous Network (HetNet). In the HetNet, low-power Transmission Points (TPs) may be flexibly and sparsely deployed in a coverage area of a macro cell Evolved Node B (eNodeB or eNB) to form a multilayer network composed of macro cells and small cells. The HetNet may not only ensure coverage, simultaneously improve cell splitting flexibility and system capacity and share service pressure of the macro cell, but also extend coverage of the macro cell. At the end of researches on 4G systems, for further improving system capacity, the Third Generation Partnership Project (3GPP) puts forward a small cell enhancement technology, and carries out preliminary researches on problems appearing during high-density deployment of small cells.

An Ultra Dense Network (UDN) is put forward under such a background, and it may be considered as a further evolution of the small cell enhancement technology. In the UDN, a density of TPs will be further increased, coverage of each TP may be further narrowed (dozens of meters and even a dozen meters), and each TP may serve only one or few users at the same time. Ultra-dense deployment shortens distances between the TPs and terminals (or called as User Equipment (UE)), which may effectively reduce their transmitted power. Since the TPs and terminals get very close, differences between uplinks and downlinks are smaller and smaller.

A Backhaul Link (BL) is a key problem to be solved by a UDN, and may directly relate to deployment cost, capacity and performance of various solutions of the UDN. Nodes in the UDN may be divided into two major categories, i.e. nodes using self-Backhaul Links (sBLs) and nodes using non-self-backhaul links (nsBLs). Self-backhaul means that the same wireless transmission technology and frequency band are used for a BL and an Access Link (AL), where the BL and the AL may implement multiplexing in a time division or frequency division manner. A node using an nsBL uses a transmission technology (for example, a Wireless Fidelity (WIFI) technology and an Asymmetric Digital Subscriber Line (ADSL) technology) and medium (for example, an optical fiber and a cable) different from the AL.

For many application scenarios (for example, a dense block) of a UDN, cost in deployment of a wired backhaul (for example, deployment or leasing cost of a cable or an optical fiber, and selection and maintenance cost of a station location) is usually unacceptable, and unplanned deployment cannot be implemented. In addition, if a wired BL is provided according to a maximum system capacity, a utilization rate of the BL may be very low, and investment cost is greatly wasted. The reasons for such deficiency are listed below.

Under a condition that TPs are densely deployed, each TP may serve a relatively smaller number of users, and thus has a great load fluctuation.

Considering the aspects of energy saving, interference control or the like, some TPs may be dynamically enabled or disabled, so that BLs may be in an idle state most often.

A content prediction and caching technology may widen a fluctuation range of a BL resource requirement.

A microwave may be frequently used as a BL of a macro eNB, but its application in a UDN may be greatly limited. On one hand, the microwave may increase hardware cost of a low-power TP. Different from the macro eNB, cost of the low-power TP in the UDN is relatively low, and microwave hardware may occupy relatively more of the hardware cost of the whole cost. Second, the microwave may also increase additional spectrum cost. If an unlicensed spectrum is adopted, it may usually be very difficult to control interference, and transmission quality of a BL cannot be guaranteed. More importantly, an antenna height of a TP in a main scenario of the UDN is relatively smaller, and the microwave may be more likely to be blocked to cause a strong fluctuation of quality of the BL.

From the above analysis, it can be seen that a self-backhaul technology is very attractive in a UDN. It does not require any wired connection, may support unplanned or semi-planned deployment of TPs, and effectively reduces deployment cost. Sharing a spectrum and a wireless transmission technology with an AL may reduce spectrum and hardware cost. By joint resource allocation of an AL and a BL, a system may adaptively regulate a resource allocation proportion according to a network load condition to increase resource utilization efficiency. In addition, due to use of a licensed spectrum, joint optimization of the wireless sBL and the AL can effectively guarantee quality of a wireless sBL and greatly improve transmission reliability.

After a wireless sBL is used, a network may be divided into three layers (as shown in FIG. 1).

(1) Macro eNBs or micro eNBs form a macro cell (a first layer network), which may obtain data from a core network and may be configured to provide coverage.

(2) Donor TPs (dTPs) (which may be pico or Remote Radio Head (RRH)) may form a second-layer network, which may obtain data from the core network or the first-layer network by virtue of an nsBL (for example, an optical fiber) and may be configured to acquire a cell splitting gain.

(3) Relay TPs (rTPs) may form a third-layer network, which may obtain data from the second-layer network through an sBL, and may be configured to improve coverage of a UDN, implement unplanned deployment of TPs and further increase capacity of the UDN.

The inventor of the application finds in a research process of the above technology that an sBL may consume a resource of an AL and may influence overall capacity of a network. Therefore, how to enhance performance of an sBL and increase a utilization rate of a radio resource becomes an important research direction. Flexible sBL/AL resource allocation may serve important means for increasing capacity of an sBL. The flexible sBL/AL may flexibly regulate a resource proportion between different links according to channel states of the sBL and an AL to achieve a purpose of fully utilizing radio resources. In addition, a content prediction and caching technology widely researched in the industry at present makes flexible resource allocation between the sBL/AL more important. This technology predicts a content to be accessed by a user in the future and caches related data in an rTP in advance, thereby greatly reducing a load of the sBL. For example, for a certain UE served by an rTP, when a downlink data packet is delivered from a core network, it may be necessary to simultaneously allocate resources to an sBL and an AL. When the data packet has been cached in the rTP, no sBL resource is required to be allocated to the rTP, and the corresponding sBL resource needs to be rapidly allocated to the AL.

A Long Term Evolution (LTE) Release 10 (R10) relay is communication equipment, applied most widely at present, using a wireless sBL. LTE R10 relays may be divided into Frequency Division Duplexing (FDD) R10 relays and Time Division Duplexing (TDD) R10 relays, corresponding to two LTE frame structures respectively. A regulation period of an sBL/AL resource proportion supported by an LTE R10 relay is very long (far longer than 1 second), and cannot meet a flexible sBL/AL resource allocation requirement. In addition, an LTE R10 relay does not support flexible resource allocation between an uplink and downlink of an AL or an sBL.

An AL and sBL of an LTE R10 relay may adopt Time Division Multiplexing (TDM) to implement multiplexing. A dTP may transmit a downlink signal of an sBL at data parts of some Multimedia Broadcast multicast service Single Frequency Network (MBSFN) subframes of a downlink subframe (i.e. an FDD subframe or TDD downlink subframe) of an AL of an rTP, and may also allocate some subframes for transmitting an uplink signal of the sBL on an uplink subframe (i.e. a subframe on an FDD uplink carrier frequency or a TDD uplink subframe) of the AL of the rTP. A control domain (located at first one or two Orthogonal Frequency Division Multiplexing (OFDM) symbols) of each MBSFN subframe may still be configured to transmit a common pilot and a control channel on the AL of the rTP, as a result, the LTE R10 relay may need to additionally design the control channel (i.e. a Relay Physical Downlink Control Channel (R-PDCCH)) for scheduling a radio resource of the sBL, which may increase implementation complexity of equipment.

FIG. 2 is a resource configuration of a TDD R10 relay. In FIG. 2, an AL uses an uplink and downlink configuration 1, that is, subframes 0, 4, 5 and 9 are downlink subframes, subframes 1 and 6 are special subframes and subframes 2, 3, 7 and 8 are uplink subframes. In the downlink subframes, the subframes 4 and 9 are MBSFN subframes, their control domains transmit reference signals and control channels of ALs, and their data domains are configured to transmit downlink signals of sBLs. The subframe 3 is configured to transmit uplink signals of the sBLs. The control domains of the MBSFN subframes transmit Cell-specific Reference Signals (CRSs)/Physical Control Format Indicator Channels (PCFICHs) (configured to notify OFDM symbol numbers of the control domains)/Physical Downlink Control channels (configured to transmit scheduling signaling related to uplink data transmission)/Physical Hybrid Automatic Repeat Request (ARQ) Indicator Channels (PHICHs) (configured to transmit Acknowledgement (ACK)/Negative Acknowledgement (NACK) signals of uplink data.

Researches made by the inventor of the application show that, in an uplink Hybrid ARQ (HARQ) timing relationship corresponding to a TDD uplink and downlink configuration, an MBSFN subframe corresponding to an sBL uplink subframe or an MBSFN subframe not corresponding to any uplink subframe does not need to schedule an AL for uplink data transmission, a PDCCH/PHICH has no use, and a control domain is only configured to transmit a CRS/PCFICH. Therefore, resources on such MBSFN subframe may be wasted.

In addition, AL/sBL resource configuration types of an LTE R10 relay are limited at present, and cannot meet a flexible AL/sBL resource allocation requirement of a UDN. For example, an LTE R10 relay does not support dynamic allocation of all resources to an AL. However, according to the above analysis, it may be quite necessary for an rTP using a content prediction and caching technology.

SUMMARY

The below is a summary about a subject matter described in the embodiments of the present disclosure in detail. The summary is not intended to limit the scope of protection of the claims.

In view of this, the application provides the following solutions.

A configuration method for resource sharing among multiple wireless links is provided, the multiple wireless links including a first link and a second link, or including a first link, a second link and a third link. The configuration method may include the following acts.

P-Q configuration may be performed on a set N formed by a group of continuous units, and a set P configured for downlink transmission of the second link/third link and a set Q configured for uplink transmission of the second link/third link in the set N may be determined.

U-V configuration may be performed on the set N, and a set U configured for downlink transmission of the first link/third link and a set V configured for uplink transmission of the first link/third link in the set N may be determined.

A set S for uplink transmission of the second link/third link and downlink transmission of the second link/third link may be determined.

In the exemplary embodiment, the units may be resource units, the set P and the set Q may not be intersected, the set U and the set V may not be intersected and both belong to a set M, where the set M=N−(P+Q), and the set S=M−(U+V).

In the disclosure, "−" represents subtraction of sets, that is, A−B represents elements obtained by subtracting a set B from a set A. For example, if A={1, 2, 3} and B={3, 4, 5}, then A−B={1, 2}. In the disclosure, "+" represents a union of sets, that is, A+B represents a sum of the set A and the set B with repeated elements removed. For example, if A={1, 2, 3} and B={3, 4, 5}, then A+B={1, 2, 3, 4, 5}.

In the exemplary embodiment, the first link may be a link between a first node and a second node; the second link may be a link between the second node and a third node; and the third link may be a link between the first node and the third node. Directions from the first node to the second node and the third node and from the second node to the third node may be downlink directions of corresponding links, and opposite directions of the downlink directions may be uplink directions of the corresponding links.

In an exemplary embodiment, the units may be subframes, Transmission Time Intervals (TTIs) or time slots.

In an exemplary embodiment, a number of units and a duration of each unit in the set N may be the same as a number of units and a duration of each unit in one or more Time Division-Long Term Evolution (TD-LTE) radio frames.

In an exemplary embodiment, the set P may include one or more special units, each special unit may include a first part and a second part, and a guarding period may be set between the first part and the second part.

In an exemplary embodiment, a number of units and a duration of each unit in the set N may be the same as a number of units and a duration of each unit in one or more TD-LTE radio frames.

Locations of one or more special units in the set N may correspond to locations of one or more special units in one or more TD-LTE radio frames corresponding to the set N.

A number of the one or more special units in the set N may be smaller than or equal to a number of special units in the one or more TD-LTE radio frames corresponding to the set N.

In an exemplary embodiment, a location and duration of the first part in each special unit may be the same as a location and duration of a Downlink Pilot Time Slot (DwPTS) in TD-LTE special units, and a location and duration of a second part in each special unit may be the same as a location and duration of an Uplink Pilot Time Slot (UpPTS) in the TD-LTE special units.

The first part may be configured for downlink transmission of the second link/third link, and the second part may be configured for uplink transmission of the second link or configured for downlink transmission of the first link/third link.

In an exemplary embodiment, the units of the set P may correspond to downlink units defined by a reference configuration Y; and/or, the units of the set Q may correspond to uplink units defined by a reference configuration X.

In the exemplary embodiment, a number of units of the reference configuration X and a number of units of the reference configuration Y may both be the same as a number of units in the set N, a number of downlink units in the reference configuration X may be more than a number of the uplink units, and a number of uplink units in the reference configuration Y may be more than a number of the downlink units.

In an exemplary embodiment, a timing relationship between downlink data transmitted on the second link/third link and an ACK/NACK signal of the downlink data may be the same as a downlink data HARQ timing relationship defined by a reference configuration X; and/or, a timing relationship between uplink data transmitted on the second link/third link and an ACK/NACK signal of the uplink data may be the same as an uplink data HARQ timing relationship defined by a reference configuration Y.

In the exemplary embodiment, the reference configuration X and the reference configuration Y may both be the same as a number of units in the set N. Units corresponding to units in the set Q in the reference configuration X may be configured for uplink transmission, and the other units in the reference configuration X may all be configured for downlink transmission. Units corresponding to units in the set P in the reference configuration Y may be configured for downlink transmission, and the other units in the reference configuration Y may all be configured for uplink transmission.

In an exemplary embodiment, the reference configuration X and the reference configuration Y may be uplink and downlink configurations of one TD-LTE radio frame; or, the reference configuration X and the reference configuration Y may be uplink and downlink configurations of a multi-frame structure formed by multiple TD-LTE radio frames with the same uplink and downlink configurations.

In an exemplary embodiment, units in the set V and units in the set U may meet the following mapping rules:

the units in the set U are in one to one correspondence with the units in the set V, and a corresponding unit, in the set V, of each unit in the set U is a unit, after the unit in the set U, at a smallest interval in units, which are in the set M, at intervals of more than or equal to 4 with the unit in the set U; or, the set V is formed by one unit, and the unit in the set V is a unit, after any unit in the set U, at a smallest interval in units, which are in the set M, at intervals of more than or equal to 4 with the last unit in the set U.

In an exemplary embodiment, the set N may be a resource set on a minimum resource configuration period.

In the exemplary embodiment, whether units in the set S are used for uplink transmission or downlink transmission may be determined by scheduling.

In an exemplary embodiment, the method may be applied to a communication system.

In an optional P-Q configuration of the communication system, the set P and the set Q may both be non-empty, and a sum of a number of units in the set P and a number of units in the set Q may be smaller than a number of units in the set N.

In an optional U-V configuration of the communication system, the set U and the set V may follow one or more configuration types as follows:
 the set U is non-empty, and the set V is non-empty;
 the set U is non-empty, and the set V is empty;
 the set U is empty, and the set V is non-empty; and
 the set U is empty, and the set V is empty.

In an exemplary embodiment, the operation that P-Q configuration is performed on the set N may include the following acts. The first node or the second node or another node in a communication system may perform P-Q configuration on the set N, and information of the P-Q configuration may be transferred to enable all of the first node, the second node and the third node to acquire the P-Q configuration.

In an exemplary embodiment, the operation that the information of the P-Q configuration is transferred may include the following act. The information of the P-Q configuration may be born in high-layer signaling for transfer.

In an exemplary embodiment, the operation that U-V configuration is performed on the set N may include the following acts. The first node or the second node or another node in a communication system may perform U-V configuration on the set N, and information of the U-V configuration may be transferred to enable both the first node and the second node or all of the first node, the second node and the third node to acquire the information of the U-V configuration.

In an exemplary embodiment, the operation that the information of the U-V configuration is transferred may include the following act. The information of the U-V configuration may be born in a physical control channel for transfer.

In an exemplary embodiment, a same channel structure may be used for downlink transmission of the multiple wireless links; and a same channel structure may also be used for corresponding uplink transmission.

In an exemplary embodiment, the first node may be a dTP, the second node may be an rTP, and the third node may be a terminal.

The first link may be an sBL between the dTP and the rTP, the second link may be an AL between the rTP and the terminal, and the third link may be an AL between the dTP and the terminal.

A signal transmission method is provided, which may be applied to a first node. The first node may perform signal transmission on a basis of a resource configuration determined by the abovementioned configuration method for resource sharing among multiple wireless links. The signal transmission method may include the following acts.

Signals may be sent to a second node on units of a set U.

Signals sent by the second node may be received on units of a set V.

In an exemplary embodiment, a third link may exist between the first node and a third node, and one or more of the following signal transmission may be performed between the first node and the third node:

signals may be sent to the third node on units of a set P;

signals sent by the third node may be received on units of a set Q;

signals may be sent to the third node on the units of the set U;

signals sent by the third node may be received on the units of the set V; and signals may be sent to the third node on units of a set S and/or signals sent by the third node may be received on units of the set S.

In an exemplary embodiment, the signals sent to the third node by the first node on the units of the set P may include all ACK/NACK signals of data sent to the first node by the third node.

In an exemplary embodiment, the signals received by the first node from the third node on the units of the set Q may include all ACK/NACK signals of data sent to the third node by the first node.

In an exemplary embodiment, the signals sent to the second node by the first node may include information of a P-Q configuration; or, the signals sent to the second node by the first node may include the information of the P-Q configuration, and signals sent to the third node by the first node may include the information of the P-Q configuration; or, the signals received by the first node from the second node may include the information of the P-Q configuration.

In an exemplary embodiment, the signals sent to the second node by the first node may include information of a U-V configuration; or, the signals sent to the second node by the first node may include the information of the U-V configuration, and signals sent to the third node by the first node may include the information of the U-V configuration; or, the signals received by the first node from the second node may include the information of the U-V configuration.

In an exemplary embodiment, the first node may send the information of the U-V configuration on units of the set P.

In an exemplary embodiment, the set P may include one or more special units, each special unit may include a first part and a second part, and a guarding period may be set between the first part and the second part.

In the exemplary embodiment, the operation that the first node sends the information of the U-V configuration on the units of the set P may include the following act. The information of the U-V configuration may be sent on the second part of the special unit in the set P.

In an exemplary embodiment, the signals sent to the third node by the first node on the units of the set P may include measurement pilots; and the signals received by the first node from the third node on the units of the set Q may include the measurement pilots.

In an exemplary embodiment, the signals sent to the third node by the first node on the units of the set P may include:

uplink scheduling signaling indicating resources for sending data to the first node by the third node on the units of one or more sets in the set Q, the set V and the set S.

A signal transmission method is provided, which may be applied to a second node. The second node may perform signal transmission on a basis of a resource configuration determined by the abovementioned configuration method for resource sharing among multiple wireless links. The signal transmission method may include the following acts.

Signals may be sent to a third node on units of a set P.

Signals sent by the third node may be received on units of a set Q.

Signals sent by a first node may be received on units of a set U.

Signals may be sent to the first node on units of a set V.

Signals may be sent to the third node on units of a set S and/or signals sent by the third node may be received on units of the set S.

In an exemplary embodiment, the signals sent to the third node by the second node on the units of the set P may include all ACK/NACK signals of data sent to the second node by the third node; and the signals received by the second node from the third node on the units of the set Q may include all ACK/NACK signals of data sent to the third node by the second node.

In an exemplary embodiment, the signals received by the second node from the first node may include information of a P-Q configuration; or, the signals received by the second node from the first node may include the information of the P-Q configuration, and the signals sent to the third node by the second node may include the information of the P-Q configuration; or, the signals sent to the first node by the second node may include the information of the P-Q configuration, and signals sent to the third node by the second node may include the information of the P-Q configuration.

In an exemplary embodiment, the signals received by the second node from the first node may include information of a U-V configuration; or, the signals received by the second node from the first node may include the information of the U-V configuration, and the signals sent to the third node by the second node may include the information of the U-V configuration; or, the signals sent to the first node by the second node may include the information of the U-V configuration; or, the signals sent to the first node by the second node may include the information of the U-V configuration, and the signals sent to the third signal by the second node may include the information of the U-V configuration.

In an exemplary embodiment, the second node may receive the information of the U-V configuration from the first node on the units of the set P;

the second node may send the information of the U-V configuration to the third node on the units of the set P; and the second node may send the information of the U-V configuration to the first node on the units of the set V.

In an exemplary embodiment, the set P may include one or more special units, each special unit may include a first part and a second part, and a guarding period may be set between the first part and the second part.

In an exemplary embodiment, the operation that the second node sends and/or receives the information of the U-V configuration on the units of the set P may include the following act. The information of the U-V configuration may be sent and/or received on the second part of the special unit in the set P.

In an exemplary embodiment, the signals sent to the third node by the second node on the units of the set P may include measurement pilots; and the signals received by the second node from the third node on the units of the set Q may include the measurement pilots.

In an exemplary embodiment, the signals sent to the third node by the second node on the units of the set P may include: uplink scheduling signaling indicating resources for sending data to the second node by the third node on units of the set Q and the set S.

In an exemplary embodiment, the method may further include the following act. The second node may send signals to the third node on the units of the set V.

A signal transmission method is provided, which may be applied to a third node. The third node may perform signal transmission on a basis of a resource configuration determined by a configuration method for resource sharing among multiple wireless links. The signal transmission method may include the following acts.

Signals sent by a second node may be received on units of a set P.

Signals may be sent to the second node on units of a set Q.

Signals sent by the second node may be received on units of a set S and/or signals may be sent to the second node on units of a set S.

In an exemplary embodiment, a third link may exist between the third node and a first node, and the third node may further perform one or more of the following signal transmission:

signals sent by the first node may be received on the units of the set P;

signals may be sent to the first node on the units of the set Q;

signals sent by the first node may be received on units of a set U;

signals may be sent to the first node on units of a set V; and signals sent by the first node may be received on units of a set S and/or signals may be sent to the first node on units of the set S.

In an exemplary embodiment, the signals received by the third node from the second node/first node on the units of the set P may include all ACK/NACK signals of data sent to the second node/first node by the third node; and the signals sent to the second node/first node by the third node on the units of the set Q may include all ACK/NACK signals of data sent to the third node by the second node/first node.

In an exemplary embodiment, the signals received by the third node from the first node may include information of a P-Q configuration; and/or, the signals received by the third node from the second node may include the information of the P-Q configuration.

In an exemplary embodiment, the signals received by the third node from the first node may include information of a U-V configuration; and/or, the signals received by the third node from the second node may include the information of the U-V configuration.

In an exemplary embodiment, the third node may receive the information of the U-V configuration from the first node on the units of the set P; and the third node may receive the information of the U-V configuration from the second node on the units of the set P.

In an exemplary embodiment, the set P may include one or more special units, each special unit may include a first part and a second part, and a guarding period may be set between the first part and the second part.

In an exemplary embodiment, the operation that the third node receives the information of the U-V configuration on the units of the set P may include the following act. The information of the U-V configuration may be received on the second part of the special unit in the set P.

In an exemplary embodiment, the signals received by the third node from the second node/first node on the units of the set P may include measurement pilots; and the signals sent to the second node/first node by the third node on the units of the set Q may include the measurement pilots.

In an exemplary embodiment, the signals received by the third node from the second node on the units of the set P may include: uplink scheduling signaling indicating resources for sending data to the second node by the third node on units of the set Q and the set S; and/or, the signals received by the third node from the first node on the units of the set P may include: uplink scheduling signaling indicating resources for sending data to the first node by the third node on the units of one or more sets in the set Q, the set V and the set S.

In an exemplary embodiment, the method may further include the following act. The third node may receive signals sent by the second node on the units of the set V.

A first node in a communication system is provided, which may include a transmission module.

The transmission module may be configured to perform signal transmission on a basis of a resource configuration determined by the abovementioned configuration method for resource sharing among multiple wireless links. The transmission module may further include a first transmission unit and a second transmission unit.

The first transmission unit may be configured to send signals to a second node on units of a set U.

The second transmission unit may be configured to receive, on units of a set V, signals sent by the second node.

In an exemplary embodiment, the transmission module may further include one or more of a third transmission unit, a fourth transmission unit, a fifth transmission unit, a sixth transmission unit and a seventh transmission unit.

The third transmission unit may be configured to send signals to a third node on units of a set P.

The fourth transmission unit may be configured to receive, on units of a set Q, signals sent by the third node.

The fifth transmission unit may be configured to send signals to the third node on the units of the set U.

The sixth transmission unit may be configured to receive, on the units of the set V, signals sent by the third node.

The seventh transmission unit may be configured to send signals to the third node on units of a set S and/or receive, on units of a set S, signals sent by the third node.

In an exemplary embodiment, the signals sent to the third node by the third transmission unit on the units of the set P may include all ACK/NACK signals of data sent to the first node by the third node; and the signals received by the fourth transmission unit from the third node on the units of the set Q may include all ACK/NACK signals of data sent to the third node by the first node.

In an exemplary embodiment, the signals sent to the second node by the first transmission unit may include information of a P-Q configuration; or, the signals sent to the second node by the first transmission unit may include the information of the P-Q configuration, and the signals sent to the third node by one or more in the third transmission unit, the fifth transmission unit and the seventh transmission unit may include the information of the P-Q configuration; or, the signals received by the second transmission unit from the second node may include the information of the P-Q configuration.

In an exemplary embodiment, the signals sent to the second node by the transmission module may include information of a U-V configuration; or, the signals sent to the second node by the transmission module may include the information of the U-V configuration, and the signals sent to the third node by the transmission module may include the information of the U-V configuration; or, the signals received by the transmission module from the second node may include the information of the U-V configuration.

In an exemplary embodiment, the transmission module may send the information of the U-V configuration to the second node in a following manner. The third transmission unit in the transmission module may send the information of the U-V configuration on the units of the set P.

In an exemplary embodiment, the transmission module may send the information of the U-V configuration to the third node in a following manner. The third transmission unit in the transmission module may send the information of the U-V configuration on the units of the set P.

In an exemplary embodiment, the transmission module may receive the information of the U-V configuration from the second node in a following manner. The second transmission unit in the transmission module may receive the information of the U-V configuration on the units of the set V.

In an exemplary embodiment, the set P may include one or more special units, each special unit may include a first part and a second part, and a guarding period may be set between the first part and the second part.

In an exemplary embodiment, the third transmission unit may send the information of the U-V configuration in a following manner. The third transmission unit may send the information of the U-V configuration on the second part of the special unit in the set P.

In an exemplary embodiment, the signals sent to the third node by the third transmission unit on the units of the set P may include measurement pilots; and the signals received by the fourth transmission unit from the third node on the units of the set Q may include the measurement pilots.

In an exemplary embodiment, the signals sent to the third node by the third transmission unit on the units of the set P may include: uplink scheduling signaling indicating resources for sending data to the first node by the third node on the units of one or more sets in the set Q, the set V and the set S.

A second node in a communication system is provided, which may include a transmission module.

The transmission module may be configured to perform signal transmission on a basis of a resource configuration determined by the abovementioned configuration method for resource sharing among multiple wireless links, and may further include a first transmission unit, a second transmission unit, a third transmission unit, a fourth transmission unit and a fifth transmission unit.

The first transmission unit may be configured to send signals to a third node on units of a set P.

The second transmission unit may be configured to receive, on units of a set Q, signals sent by the third node.

The third transmission unit may be configured to receive, on units of a set U, signals sent by a first node.

The fourth transmission unit may be configured to send signals to the first node on units of a set V.

The fifth transmission unit may be configured to send signals to the third node on units of a set S and/or receive, on units of a set S, signals sent by the third node.

In an exemplary embodiment, the signals sent to the third node by the first transmission unit on the units of the set P may include all ACK/NACK signals of data sent to the second node by the third node; and the signals received by the second transmission unit from the third node on the units of the set Q may include all ACK/NACK signals of data sent to the third node by the second node.

In an exemplary embodiment, the signals received by the third transmission unit from the first node may include information of a P-Q configuration; or, the signals received by the third transmission unit from the first node may include the information of the P-Q configuration, and the signals sent to the third node by the first transmission unit and/or the fifth transmission unit may include the information of the P-Q configuration; or, the signals sent to the first node by the fourth transmission unit may include the information of the P-Q configuration, and the signals sent to the third node by the first transmission unit and/or the fifth transmission unit may include the information of the P-Q configuration.

In an exemplary embodiment, the signals received by the transmission module from the first node may include information of a U-V configuration; or, the signals received by the transmission module from the first node may include the information of the U-V configuration, and the signals sent to the third node by the transmission module may include the information of the U-V configuration; or, the signals sent to the first node by the transmission module may include the information of the U-V configuration; or, the signals sent to the first node by the transmission module may include the information of the U-V configuration, and the signals sent to the third signal by the transmission module may include the information of the U-V configuration.

In an exemplary embodiment, the first transmission unit may further be configured to: receive the information of the U-V configuration from the first node on the units of the set P. The transmission module may receive the information of the U-V configuration from the first node in a following manner. The first transmission unit may receive the information of the U-V configuration from the first node on the units of the set P.

The transmission module may send the information of the U-V configuration to the third node in a following manner. The first transmission unit may send the information of the U-V configuration to the third node on the units of the set P.

The transmission module may send the information of the U-V configuration to the first node in a following manner. The fourth transmission unit may send the information of the U-V configuration to the first node on the units of the set V.

In an exemplary embodiment, the set P may include one or more special units, each special unit may include a first part and a second part, and a guarding period may be set between the first part and the second part.

In an exemplary embodiment, the first transmission unit may send and/or receive the information of the U-V configuration on the units of the set P in a following manner. The information of the U-V configuration may be sent and/or received on the second part of the special unit in the set P.

In an exemplary embodiment, the signals sent to the third node by the first transmission unit on the units of the set P may include measurement pilots; and the signals received by the second transmission unit from the third node on the units of the set Q may include the measurement pilots.

In an exemplary embodiment, the signals sent to the third node by the first transmission unit on the units of the set P may include: uplink scheduling signaling indicating resources for sending data to the second node by the third node on units of the set Q and the set S.

In an exemplary embodiment, the fourth transmission unit may further be configured to: send signals to the third node on the units of the set V.

A third node in a communication system is provided, which may include a transmission module.

The transmission module may be configured to perform signal transmission on a basis of a resource configuration determined by a configuration method for resource sharing among multiple wireless links. The transmission module may include a first transmission unit, a second transmission unit and a third transmission unit.

The first transmission unit may be configured to receive, on units of a set P, signals sent by a second node.

The second transmission unit may be configured to send signals to the second node on units of a set Q.

The third transmission unit may be configured to receive, on units of a set S, signals sent by the second node and/or send signals to the second node on units of the set S.

In an exemplary embodiment, the transmission module may further include one or more of a fourth transmission unit, a fifth transmission unit, a sixth transmission unit, a seventh transmission unit and an eighth transmission unit.

The fourth transmission unit may be configured to receive signals sent by a first node on the units of the set P.

The fifth transmission unit may be configured to send signals to the first node on the units of the set Q.

The sixth transmission unit may be configured to receive, on units of a set U, signals sent by the first node.

The seventh transmission unit may be configured to send signals to the first node on units of a set V.

The eighth transmission unit may be configured to receive, on the units of the set S, signals sent by the first node and/or send signals to the first node on the units of the set S.

In an exemplary embodiment, the signals received by the first transmission unit/fourth transmission unit from the second node/first node on the units of the set P may include all ACK/NACK signals of data sent to the second node/first node by the third node; and the signals sent to the second node/first node by the second transmission unit/fifth transmission unit on the units of the set Q may include all ACK/NACK signals of data sent to the third node by the second node/first node.

In an exemplary embodiment, the signals received by the transmission module from the first node may include information of a P-Q configuration; and/or, the signals received by the transmission module from the second node may include the information of the P-Q configuration.

In an exemplary embodiment, the signals received by the transmission module from the first node may include information of a U-V configuration; and/or, the signals received by the transmission module from the second node may include the information of the U-V configuration.

In an exemplary embodiment, the transmission module may receive the information of the U-V configuration from the first node in a following manner. The fourth transmission unit may receive the information of the U-V configuration from the first node on the units of the set P.

In an exemplary embodiment, the transmission module may receive the information of the U-V configuration from the second node in a following manner. The first transmission unit may receive the information of the U-V configuration from the second node on the units of the set P.

In an exemplary embodiment, the set P may include one or more special units, each special unit may include a first part and a second part, and a guarding period may be set between the first part and the second part.

In an exemplary embodiment, the fourth transmission unit may receive the information of the U-V configuration from the first node on the units of the set P in a following manner. The information of the U-V configuration may be received on the second part of the special unit in the set P.

In an exemplary embodiment, the first transmission unit may receive the information of the U-V configuration from the second node on the units of the set P in a following manner. The information of the U-V configuration may be received on the second part of the special unit in the set P.

In an exemplary embodiment, the signals received by the first transmission unit/fourth transmission unit from the second node/first node on the units of the set P may include measurement pilots; and the signals sent to the second node/first node by the second transmission unit/fifth transmission unit on the units of the set Q may include the measurement pilots.

In an exemplary embodiment, the signals received by the first transmission unit from the second node on the units of the set P may include: uplink scheduling signaling indicating resources for sending data to the second node by the third node on units of the set Q and the set S; and/or, the signals received by the fourth transmission unit from the first node on the units of the set P may include: uplink scheduling signaling indicating resources for sending data to the first node by the third node on the units of one or more sets in the set Q, the set V and the set S.

In an exemplary embodiment, the first transmission unit may further be configured to: receive signals sent by the second node on the units of the set V.

In addition, an embodiment of the present disclosure provides a computer-readable storage medium, which may store a computer-executable instruction. The computer-executable instruction may be executed to implement the abovementioned configuration method for resource sharing of the multiple wireless links.

In addition, an embodiment of the present disclosure provides a computer-readable storage medium, which may store a computer-executable instruction. The computer-executable instruction may be executed to implement a signal transmission method applied to a first node.

In addition, an embodiment of the present disclosure provides a computer-readable storage medium, which may store a computer-executable instruction. The computer-executable instruction may be executed to implement a signal transmission method applied to a second node.

In addition, an embodiment of the present disclosure provides a computer-readable storage medium, which may store a computer-executable instruction. The computer-executable instruction may be executed to implement a signal transmission method applied to a third node.

The solutions may have at least one of the following beneficial effects.

Flexible and rapid resource allocation of the multiple wireless links such as the sBL and the AL may be supported.

A resource allocation range, for example, resource allocation ranges of the sBL and the AL, may be widened, and almost all resources may even be allocated to the AL.

All resources of the second link, for example, the sBL, may be configured to transmit sBL signals, so that utilization efficiency of the resources may be improved.

The second link, for example, the sBL, may use a channel structure (for example, a PDCCH) completely the same as another link, for example, the AL, and is not required to additionally support an R-PDCCH like a relay, so that implementation complexity of equipment may be reduced, and unified design of the sBL and the AL may be implemented.

A resource proportion of the multiple wireless links, for example, the sBL and the AL, may be rapidly and dynamically regulated, and an uplink and downlink resource proportion regulation space may be larger.

Higher utilization efficiency of uplink resources of the second link, for example, the sBL, may be achieved.

After the drawings and the detailed descriptions are read and understood, the other aspects can be comprehended.

BRIEF DESCRIPTION OF THE DRAWINGS

FIG. 3B is a schematic diagram of a network architecture according to a first application example of the present disclosure, an rTP being terminal equipment;

FIG. 4 is a schematic diagram of sets P&Q&M according to a second application example of the present disclosure;

FIG. 5(A), FIG. 5(B) and FIG. 5(C) are schematic diagrams of signal sending directions of subframes in sets P&Q according to a second application example of the present disclosure;

FIG. 13 is a flowchart of a configuration method according to a first embodiment of the present disclosure; and FIG. 14 is a module diagram of each node according to the second, third and fourth embodiments of the present disclosure.

DETAILED DESCRIPTION OF THE EMBODIMENTS

Figure 1:
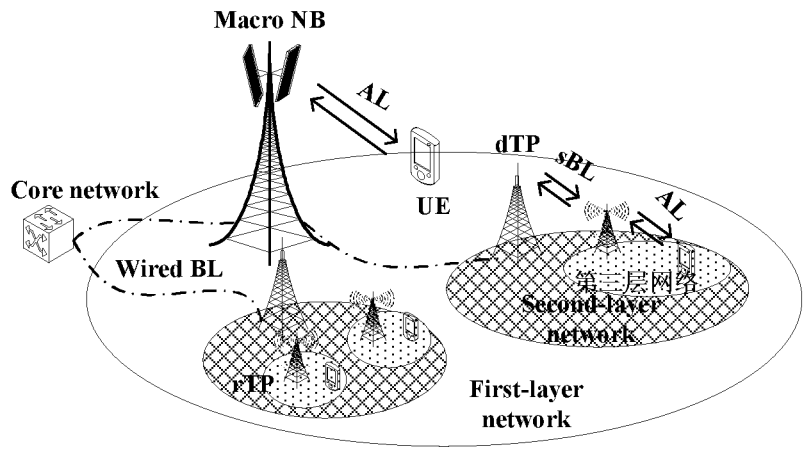
FIG. 1 is a schematic diagram of a three-layer network.
Figure 2:
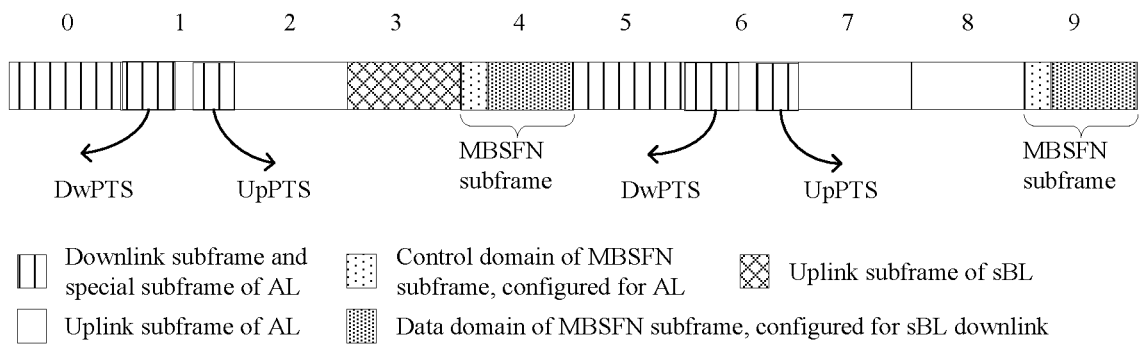
FIG. 2 is a schematic diagram of a resource configuration of a TDD LTE R10 relay.

The embodiments of the present disclosure will be described below in combination with the drawings in detail. It is important to note that the embodiments in the application and characteristics in the embodiments may be freely combined without conflicts.

For expression "x/y" in the application, when x and y therein represent nodes or links, "x/y" represents "x, or x and y". For example, "second link/third link" represents "second link, or second link and third link". For another example, "second node/first node" represents "second node, or second node and first node", and so on. It is important to note that expression "x and/or y" in the application also represents "x, or y, or x and y".

First Embodiment

The embodiment provides a configuration method for resource sharing among multiple wireless links. The multiple wireless links may include a first link and a second link, or may include a first link, a second link and a third link. As shown in FIG. 13, the method may include the following acts.

At act 110, P-Q configuration may be performed on a set N formed by a group of continuous units, and a set P configured for downlink transmission of the second link/third link and a set Q configured for uplink transmission of the second link/third link in the set N may be determined.

At act 120, U-V configuration may be performed on the set N, and a set U configured for downlink transmission of the first link/third link and a set V configured for uplink transmission of the first link/third link in the set N may be determined; and a set S for uplink transmission of the second link/third link and downlink transmission of the second link/third link may be determined.

In the embodiment, whether units in the set S are used for uplink transmission or downlink transmission may be determined by scheduling.

In the embodiment, the units may be resource units, for example, subframes, TTIs or time slots.

In the embodiment, the set P and the set Q are not intersected, the set U and the set V are not intersected and both belong to a set M, where the set M=N−(P+Q), and the set S=M−(U+V). In an example, the set N may be a resource set on a minimum resource configuration period.

In the embodiment, the first link may be a link between a first node and a second node; the second link may be a link between the second node and a third node; and the third link may be a link between the first node and the third node. Directions from the first node to the second node and the third node and from the second node to the third node may be downlink directions of corresponding links, and opposite directions of the downlink directions may be uplink directions of the corresponding links. In an example, the first node may be a dTP, the second node may be an rTP, and the third node may be a terminal. Correspondingly, the first link may be an sBL between the dTP and the rTP, the second link may be an AL between the rTP and the terminal, and the third link may be an AL between the dTP and the terminal. Downlink directions of the corresponding links may be from the dTP to the rTP and the terminal and from the rTP to the terminal, and opposite directions (from the terminal to the dTP and the rTP and from the rTP to the dTP) of the downlink directions may be uplink directions of the corresponding links.

In an example, a number of units and a duration of each unit in the set N may be the same as a number of units and a duration of each unit in one or more TD-LTE radio frames.

In an example, the set P may include one or more special units, each special unit may include a first part and a second part, and a guarding period may be set between the first part and the second part. A location and duration of the first part in each special unit may be the same as a location and duration of a DwPTS in TD-LTE special units, and a location and duration of a second part in each special unit may be the same as a location and duration of a UpPTS in the TD-LTE special units.

In the example, if a number of units and the duration of each unit in the set N are the same as a number of units and the duration of each unit in the one or more TD-LTE radio frames, the locations of one or more special units in the set N may correspond to the locations of the one or more special units in one or more TD-LTE radio frames corresponding to the set N. A number of the one or more special units in the set N may be smaller than or equal to a number of the special units in the one or more TD-LTE radio frames corresponding to the set N, that is, part of the special units, for example, special subframes, in the TD-LTE radio frames, may not be set in the set N.

In the example, optionally, a location and duration of the first part in each special unit may be the same as a location and duration of a DwPTS in TD-LTE special units, and a location and duration of a second part in each special unit may be the same as a location and duration of a UpPTS in the TD-LTE special units. The first part may be configured for downlink transmission of the second link/third link, and the second part may be configured for uplink transmission of the second link or configured for downlink transmission of the first link/third link.

In an example, the units of the set P may correspond to downlink units defined by a reference configuration Y; and/or, the units of the set Q may correspond to uplink units defined by a reference configuration X. A number of units of the reference configuration X and a number of units of the reference configuration Y may be both the same as a number of units in the set N, a number of downlink units in the reference configuration X may be more than a number of the uplink units, and a number of uplink units in the reference configuration Y may be more than a number of the downlink units.

In an example, a timing relationship between downlink data transmitted on the second link/third link and an ACK/NACK signal of the downlink data may be the same as a downlink data HARQ timing relationship defined by a reference configuration X; and/or, a timing relationship between uplink data transmitted on the second link/third link and an ACK/NACK signal of the uplink data may be the same as an uplink data HARQ timing relationship defined by a reference configuration Y.

The reference configuration X and the reference configuration Y may be both the same as a number of units in the set N. Units corresponding to units in the set Q in the reference configuration X may be configured for uplink transmission, and the other units in the reference configuration X may all be configured for downlink transmission. Units corresponding to units in the set P in the reference configuration Y may be configured for downlink transmission, and the other units in the reference configuration Y may all be configured for uplink transmission.

In the above two examples, the reference configuration X and the reference configuration Y may be uplink and downlink configurations of one TD-LTE radio frame; or, the reference configuration X and the reference configuration Y may be uplink and downlink configurations of a multi-frame structure formed by multiple TD-LTE radio frames with the same uplink and downlink configurations.

In an example, units in the set V and units in the set U may meet the following mapping rules:

the units in the set U are in one to one correspondence with the units in the set V, and a corresponding unit, in the set V, of each unit in the set U is a unit, after the unit in the set U, at a smallest interval in units, which are in the set M, at intervals of more than or equal to 4 with the unit in the set U; or, the set V is formed by one unit, and the unit in the set V is a unit, after any unit in the set U, at a smallest interval in units, which are in the set M, at intervals of more than or equal to 4 with the last unit in the set U.

In an example, in an optional P-Q configuration of a communication system, the set P and the set Q may both be non-empty, and a sum of a number of units in the set P and a number of units in the set Q may be smaller than a number of units in the set N.

In an optional U-V configuration of the communication system, the set U and the set V may follow one or more configuration types as follows:

the set U is non-empty, and the set V is non-empty;
the set U is non-empty, and the set V is empty;
the set U is empty, and the set V is non-empty; and
the set U is empty, and the set V is empty.

In the example, U and V may both be empty, and when U and V are empty, resources in the set M may all be configured for transmission of the second link, and a resource allocation range may be larger.

In an example, the operation that P-Q configuration is performed on the set N may include the following acts. The first node or the second node or another node in a communication system may perform P-Q configuration on the set N, and information of the P-Q configuration may be transferred to enable all of the first node, the second node and the third node to acquire the P-Q configuration. The information of the P-Q configuration may be born in high-layer signaling for transfer to implement semi-static configuration.

In an example, the operation that U-V configuration is performed on the set N may include the following acts. The first node or the second node or another node in a communication system may perform U-V configuration on the set N, and information of the U-V configuration may be transferred to enable both the first node and the second node or all of the first node, the second node and the third node to acquire the information of the U-V configuration. The information of the U-V configuration may be born in a physical control channel for transfer to implement dynamic configuration.

In an example, a same channel structure may be used for downlink transmission of the multiple wireless links; and a same channel structure may also be used for corresponding uplink transmission.

Second Embodiment

The embodiment is a signal transmission method applied to a first node. The first node may perform signal transmission on a basis of a resource configuration of the first embodiment. The signal transmission method may include the following acts.

Signals may be sent to a second node on units of a set U.

Signals sent by the second node may be received on units of a set V.

When a third link exists between the first node and a third node, and one or more of the following signal transmission may be performed between the first node and the third node.

Signals may be sent to the third node on units of a set P.

Signals sent by the third node may be received on units of a set Q.

Signals may be sent to the third node on the units of the set U.

Signals sent by the third node may be received on the units of the set V.

Signals may be sent to the third node and/or signals sent by the third node may be received on units of a set S.

In an example, the signals sent to the third node by the first node on the units of the set P may include all ACK/NACK signals of data sent to the first node by the third node; and the signals received by the first node from the third node on the units of the set Q may include all ACK/NACK signals of data sent to the third node by the first node.

In the example, the ACK/NACK signals may be transmitted on the units of P and Q in a centralized manner, which is favorable for flexible allocation of resources in the set S. The same applies for other embodiments.

In an example, the following transmission manners (the same applies for the other embodiments) may be adopted for a P-Q configuration among the three nodes:

when the first node performs P-Q configuration or first receives information of the P-Q configuration, the first node may send information of the P-Q configuration to the second node, and the first node and/or the second node may send the information of the P-Q configuration to the third node; or, when the second node performs P-Q configuration, the second node may send the information of the P-Q configuration to the first node and the third node.

In the above transmission manners, the first node may perform the following transmission:

the signals sent to the second node by the first node may include the information of the P-Q configuration; or, the signals sent to the second node by the first node may include the information of the P-Q configuration, and the signals sent to the third node by the first node include the information of the P-Q configuration; or, the signals received by the first node from the second node may include the information of the P-Q configuration.

The information of the P-Q configuration may be born in high-layer signaling for sending as data of a physical layer.

In an example, the following transmission manners (the same applies for the other embodiments) may be adopted for a U-V configuration among the three nodes:

when the first node performs U-V configuration or first receives information of the U-V configuration, the first node may send the information of the U-V configuration to the second node, and may not send the information of the U-V configuration to the third node, or the first node and/or the second node may send the information of the U-V configuration to the third node; and when the second node performs U-V configuration, the second node may send the information of the U-V configuration to the first node, and may not send the information of the U-V configuration to the third node, or the second node may send the information of the U-V configuration to the third node.

In the above transmission manners, the first node may perform the following transmission:

the signals sent to the second node by the first node may include the information of the U-V configuration; or, the signals sent to the second node by the first node may include the information of the U-V configuration, and the signals sent to the third node by the first node may include the information of the U-V configuration; or, the signals received by the first node from the second node may include the information of the U-V configuration.

In the example, the first node may send the information of the U-V configuration on the units of the set P. At this moment, the set P may be further configured for downlink transmission of the information of the U-V configuration through the first link. In an exemplary embodiment, if the set P includes one or more special units, each special unit may include a first part and a second part, and a guarding period may be set between the first part and the second part. The first node may send the information of the U-V configuration on the second part of the special unit in the set P. For the second node, due to existence of a sending and receiving switching guarding period, the information of the U-V configuration may be received from the first node on the second parts.

In an example, the signals sent to the third node by the first node on the units of the set P may include measurement pilots.

In an example, the signals received by the first node from the third node on the units of the set Q may include the measurement pilots.

In the example, the uplink and downlink measurement pilots of the third link may be sent on the sets P and Q, and then no measurement pilots may be sent on the resources on the set S, so that a resource utilization rate may be increased. (The same applies for the other embodiments).

In an example, the signals sent to the third node by the first node on the units of the set P may include: uplink scheduling signaling indicating resources for sending data to the first node by the third node on the units of one or more sets in the set Q, the set V and the set S.

In the example, all the uplink scheduling signaling may be sent on the set P, so that resources of the other sets may be allocated more flexibly (the same applies for the embodiments).

Correspondingly, the embodiment provides a first node in a communication system, which may include a transmission module.

The transmission module may be configured to perform signal transmission on a basis of a resource configuration determined by the method of the first embodiment, and may further include a first transmission unit and a second transmission unit.

The first transmission unit may be configured to send signals to a second node on units of a set U.

The second transmission unit may be configured to receive, on units of a set V, signals sent by the second node.

In an example, the transmission module may further include one or more of a third transmission unit, a fourth transmission unit, a fifth transmission unit, a sixth transmission unit and a seventh transmission unit.

The third transmission unit may be configured to send signals to a third node on units of a set P.

The fourth transmission unit may be configured to receive, on units of a set Q, signals sent by the third node.

The fifth transmission unit may be configured to send signals to the third node on the units of the set U.

The sixth transmission unit may be configured to receive, on the units of the set V, signals sent by the third node.

The seventh transmission unit may be configured to send signals to the third node on units of a set S and/or receive, on units of a set S, signals sent by the third node.

In an example, the signals sent to the third node by the third transmission unit on the units of the set P may include all ACK/NACK signals of data sent to the first node by the third node.

In an example, the signals received by the fourth transmission unit from the third node on the units of the set Q may include all ACK/NACK signals of data sent to the third node by the first node.

In an example, the signals sent to the second node by the first transmission unit may include information of a P-Q configuration; or, the signals sent to the second node by the first transmission unit may include the information of the P-Q configuration, and the signals sent to the third node by one or more in the third transmission unit, the fifth transmission unit and the seventh transmission unit may include the information of the P-Q configuration; or, the signals received by the second transmission unit from the second node may include the information of the P-Q configuration.

In an example, the signals sent to the second node by the transmission module may include information of a U-V configuration; or, the signals sent to the second node by the transmission module may include the information of the U-V configuration, and the signals sent to the third node by the transmission module may include the information of the U-V configuration; or, the signals received by the transmission module from the second node may include the information of the U-V configuration.

In an example, the transmission module may send the information of the U-V configuration to the second node in a following manner. The third transmission unit in the transmission module may send the information of the U-V configuration on the units of the set P.

In an example, the transmission module may send the information of the U-V configuration to the third node in a following manner. The third transmission unit in the transmission module may send the information of the U-V configuration on the units of the set P.

In an example, the transmission module may receive the information of the U-V configuration from the second node in a following manner. The second transmission unit in the transmission module may receive the information of the U-V configuration on the units of the set V.

In an example, the set P may include one or more special units, each special unit may include a first part and a second part, and a guarding period may be set between the first part and the second part.

The third transmission unit may send the information of the U-V configuration in a following manner. The third transmission unit may send the information of the U-V configuration on the second part of the special unit in the set P.

In an example, the signals sent to the third node by the third transmission unit on the units of the set P may include measurement pilots.

In an example, the signals received by the fourth transmission unit from the third node on the units of the set Q may include the measurement pilots.

In an example, the signals sent to the third node by the third transmission unit on the units of the set P may include: uplink scheduling signaling indicating resources for sending data to the first node by the third node on the units of one or more sets in the set Q, the set V and the set S.

Third Embodiment

The embodiment provides a signal transmission method, which may be applied to a second node.

The second node may perform signal transmission on a basis of a resource configuration determined by the method of the first embodiment. The signal transmission method may include the following acts.

Signals may be sent to a third node on units of a set P.

Signals sent by the third node may be received on units of a set Q.

Signals sent by a first node may be received on units of a set U.

Signals may be sent to the first node on units of a set V.

Signals may be sent to the third node on units of a set S and/or signals sent by the third node may be received on units of a set S.

In an example, the signals sent to the third node by the second node on the units of the set P may include all ACK/NACK signals of data sent to the second node by the third node.

In an example, the signals received by the second node from the third node on the units of the set Q may include all ACK/NACK signals of data sent to the third node by the second node.

In an example, the signals received by the second node from the first node may include information of a P-Q configuration; or, the signals received by the second node from the first node may include the information of the P-Q configuration, and the signals sent to the third node by the second node may include the information of the P-Q configuration; or, the signals sent to the first node by the second node may include the information of the P-Q configuration, and the signals sent to the third node by the second node may include the information of the P-Q configuration.

In an example, the signals received by the second node from the first node may include information of a U-V configuration; or, the signals received by the second node from the first node may include the information of the U-V configuration, and the signals sent to the third node by the second node may include the information of the U-V configuration; or, the signals sent to the first node by the second node may include the information of the U-V configuration; or, the signals sent to the first node by the second node may include the information of the U-V configuration, and the signals sent to the third signal by the second node may include the information of the U-V configuration.

In the example, optionally, the second node may receive the information of the U-V configuration from the first node on the units of the set P;

the second node may send the information of the U-V configuration to the third node on the units of the set P; and the second node may send the information of the U-V configuration to the first node on the units of the set V.

If the set P includes one or more special units, each special unit may include a first part and a second part, and a guarding period may be set between the first part and the second part. The second node may send and/or receive the information of the U-V configuration on the second part of the special unit in the set P.

In an example, the signals sent to the third node by the second node on the units of the set P may include measurement pilots.

In an example, the signals received by the second node from the third node on the units of the set Q may include the measurement pilots.

In an example, the signals sent to the third node by the second node on the units of the set P may include: uplink scheduling signaling indicating resources for sending data to the second node by the third node on units of the set Q and the set S.

In an example, the method may further include the following act. The second node may send signals to the third node on the units of the set V. At this moment, the set V may further be configured for downlink transmission of the second link.

Correspondingly, the embodiment provides a second node in a communication system, which may include a transmission module.

The transmission module may be configured to perform signal transmission on a basis of a resource configuration determined by the method of the first embodiment. and may further include a first transmission unit, a second transmission unit, a third transmission unit, a fourth transmission unit and a fifth transmission unit.

The first transmission unit may be configured to send signals to a third node on units of a set P.

The second transmission unit may be configured to receive, on units of a set Q, signals sent by the third node.

The third transmission unit may be configured to receive, on units of a set U, signals sent by a first node.

The fourth transmission unit may be configured to send signals to the first node on units of a set V.

The fifth transmission unit may be configured to send signals to the third node on units of a set S and/or receive, on units of a set S, signals sent by the third node.

In an example, the signals sent to the third node by the first transmission unit on the units of the set P may include all ACK/NACK signals of data sent to the second node by the third node.

In an example, the signals received by the second transmission unit from the third node on the units of the set Q may include all ACK/NACK signals of data sent to the third node by the second node.

In an example, the signals received by the third transmission unit from the first node may include information of a P-Q configuration; or, the signals received by the third transmission unit from the first node may include the information of the P-Q configuration, and the signals sent to the third node by the first transmission unit and/or the fifth transmission unit may include the information of the P-Q configuration; or, the signals sent to the first node by the fourth transmission unit may include the information of the P-Q configuration, and the signals sent to the third node by the first transmission unit and/or the fifth transmission unit may include the information of the P-Q configuration.

In an example, the signals received by the transmission module from the first node may include information of a U-V configuration; or, the signals received by the transmission module from the first node may include the information of the U-V configuration, and the signals sent to the third node by the transmission module may include the information of the U-V configuration; or, the signals sent to the first node by the transmission module may include the information of the U-V configuration; or, the signals sent to the first node by the transmission module may include the information of the U-V configuration, and the signals sent to the third signal by the transmission module may include the information of the U-V configuration.

In an example, the first transmission unit may further be configured to: receive the information of the U-V configuration from the first node on the units of the set P. The transmission module may receive the information of the U-V configuration from the first node in a following manner. The first transmission unit may receive the information of the U-V configuration from the first node on the units of the set P.

The transmission module may send the information of the U-V configuration to the third node in a following manner. The first transmission unit may send the information of the U-V configuration to the third node on the units of the set P.

The transmission module may send the information of the U-V configuration to the first node in a following manner. The fourth transmission unit may send the information of the U-V configuration to the first node on the units of the set V.

In an example, the set P may include one or more special units, each special unit may include a first part and a second part, and a guarding period may be set between the first part and the second part.

The first transmission unit may send and/or receive the information of the U-V configuration on the units of the set P in a following manner. The information of the U-V configuration may be sent and/or received on the second part of the special unit in the set P.

In an example, the signals sent to the third node by the first transmission unit on the units of the set P may include measurement pilots.

In an example, the signals received by the second transmission unit from the third node on the units of the set Q may include the measurement pilots.

In an example, the signals sent to the third node by the first transmission unit on the units of the set P may include: uplink scheduling signaling indicating resources for sending data to the second node by the third node on units of the set Q and the set S.

In an example, the fourth transmission unit may further be configured to send signals to the third node on the units of the set V.

Fourth Embodiment

The embodiment provides a signal transmission method, which may be applied to a third node.

The third node may perform signal transmission on a basis of a resource configuration determined by a method of the first embodiment. The signal transmission method may include the following acts.

Signals sent by a second node may be received on units of a set P.

Signals may be sent to the second node on units of a set Q.

Signals sent by the second node may be received on units of a set S and/or signals may be sent to the second node on units of a set S.

In an example, when a third link exists between the third node and a first node, the third node may further perform one or more of the following signal transmission:

signals sent by the first node may be received on the units of the set P;

signals may be sent to the first node on the units of the set Q;

signals sent by the first node may be received on units of a set U;

signals may be sent to the first node on units of a set V; and signals sent by the first node may be received on units of a set S and/or signals may be sent to the first node on units of a set S.

In an example, the signals received by the third node from the second node/first node on the units of the set P may include all ACK/NACK signals of data sent to the second node/first node by the third node.

In an example, the signals sent to the second node/first node by the third node on the units of the set Q may include all ACK/NACK signals of data sent to the third node by the second node/first node.

In an example, the signals received by the third node from the first node may include information of a P-Q configuration; and/or, the signals received by the third node from the second node may include the information of the P-Q configuration.

In an example, the signals received by the third node from the first node may include information of a U-V configuration; and/or, the signals received by the third node from the second node may include the information of the U-V configuration.

In the example, the third node may receive the information of the U-V configuration from the first node on the units of the set P. The third node may receive the information of the U-V configuration from the second node on the units of the set P. If the set P includes one or more special units, each special unit may include a first part and a second part, and a guarding period may be set between the first part and the second part. The third node may receive the information of the U-V configuration on the second part of the special unit in the set P.

In an example, the signals received by the third node from the second node/first node on the units of the set P may include measurement pilots.

In an example, the signals sent to the second node/first node by the third node on the units of the set Q may include the measurement pilots.

In an example, the signals received by the third node from the second node on the units of the set P may include: uplink scheduling signaling indicating resources for sending data to the second node by the third node on units of the set Q and the set S; and/or, the signals received by the third node from the first node on the units of the set P may include: uplink scheduling signaling indicating resources for sending data to the first node by the third node on the units of one or more sets in the set Q, the set V and the set S.

In an example, the method may further include the following act. The third node may receive signals sent by the second node on the units of the set V.

The embodiment provides a third node in a communication system, which may include a transmission module.

The transmission module may be configured to perform signal transmission on a basis of a resource configuration determined by the method of the first embodiment, and may further include a first transmission unit, a second transmission unit and a third transmission unit.

The first transmission unit may be configured to receive, on units of a set P, signals sent by a second node.

The second transmission unit may be configured to send signals to the second node on units of a set Q.

The third transmission unit may be configured to receive, on units of a set S, signals sent by the second node and/or send signals to the second node on units of the set S.

In an example, the transmission module may further include one or more of a fourth transmission unit, a fifth transmission unit, a sixth transmission unit, a seventh transmission unit and an eighth transmission unit.

The fourth transmission unit may be configured to receive, on the units of the set P, signals sent by a first node.

The fifth transmission unit may be configured to send signals to the first node on the units of the set Q.

The sixth transmission unit may be configured to receive, on units of a set U, signals sent by the first node.

The seventh transmission unit may be configured to send signals to the first node on units of a set V.

The eighth transmission unit may be configured to receive, on the units of the set S, signals sent by the first node and/or send signals to the first node on the units of the set S.

In an example, the signals received by the first transmission unit/fourth transmission unit from the second node/first node on the units of the set P may include all ACK/NACK signals of data sent to the second node/first node by the third node.

In an example, the signals sent to the second node/first node by the second transmission unit/fifth transmission unit on the units of the set Q may include all ACK/NACK signals of data sent to the third node by the second node/first node.

In an example, the signals received by the transmission module from the first node may include information of a P-Q configuration; and/or, the signals received by the transmission module from the second node may include the information of the P-Q configuration.

In an example, the signals received by the transmission module from the first node may include information of a U-V configuration; and/or, the signals received by the transmission module from the second node may include the information of the U-V configuration.

In an example, the transmission module may receive the information of the U-V configuration from the first node in a following manner. The fourth transmission unit may receive the information of the U-V configuration from the first node on the units of the set P.

In an example, the transmission module may receive the information of the U-V configuration from the second node in a following manner. The first transmission unit may receive the information of the U-V configuration from the second node on the units of the set P.

In an example, the set P may include one or more special units, each special unit may include a first part and a second part, and a guarding period may be set between the first part and the second part.

In an example, the fourth transmission unit may receive the information of the U-V configuration from the first node on the units of the set P in a following manner. The information of the U-V configuration may be received on the second part of the special unit in the set P.

In an example, the first transmission unit may receive the information of the U-V configuration from the second node on the units of the set P in a following manner. The information of the U-V configuration may be received on the second part of the special unit in the set P.

In an example, the signals received by the first transmission unit/fourth transmission unit from the second node/first node on the units of the set P may include measurement pilots.

In an example, the signals sent to the second node/first node by the second transmission unit/fifth transmission unit on the units of the set Q may include the measurement pilots.

In an example, the signals received by the first transmission unit from the second node on the units of the set P may include: uplink scheduling signaling indicating resources for sending data to the second node by the third node on units of the set Q and the set S; and/or, the signals received by the fourth transmission unit from the first node on the units of the set P may include: uplink scheduling signaling indicating resources for sending data to the first node by the third node on the units of one or more sets in the set Q, the set V and the set S.

In an example, the first transmission unit may further be configured to: receive signals sent by the second node on the units of the set V.

The modules of the nodes in each of the abovementioned embodiments may refer to FIG. 14.

The application will be described below form each aspect through some practical application examples.

First Application Example

Figure 3A:
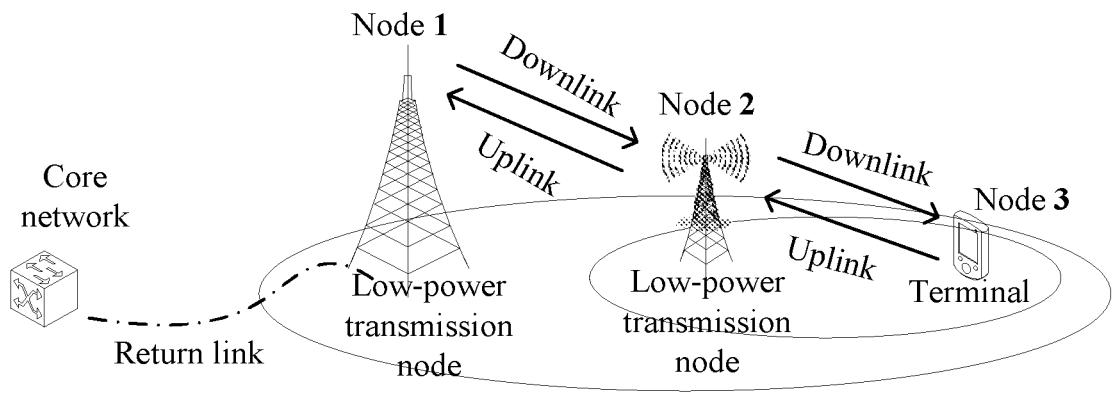
FIG. 3A is a schematic diagram of a network architecture according to a first application example of the present disclosure, an rTP being non-terminal equipment.

As shown in FIG. 3A, a first node (node 1) is a dTP, a second node (node 2) is an rTP, a third node (node 3) is a terminal, and they form a second-layer and third-layer networks. However, the first node, the second node and the third node are not limited to the present example. A first link exists between any first node and second node, and a second link exists between the second node and the third node. When both the first link and the second link are wireless links and share resources, the abovementioned solutions may be adopted. In the embodiment, the first node is connected with a core network through a wired return link, and may obtain downlink data or send uplink data to the core network. The second node may obtain downlink data from the first node or send uplink data to the first node by virtue of an sBL. The third node is a terminal, which may obtain downlink data from the second node, or send uplink data to the second node. In FIG. 3B, a terminal may be adopted to realize a function of the rTP, and at this moment, the terminal should be considered as the rTP.

Second Application Example

A time window (i.e. a set N) of the application example may be one radio frame. There is made such a hypothesis that a TD-LTE frame structure is used (the set N and one or more TD-LTE radio frames have the same subframe number and subframe duration), and uplink and downlink configurations of a TD-LTE radio frame are shown in Table 1. Therefore, the set N includes 10 subframes of one radio frame, that is, N={0, 1, 2, 3, 4, 5, 6, 7, 8, 9}.

TABLE 1

| Uplink and downlink configuration index | Uplink and downlink switching point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in FIG. 4, a set P is formed by subframes 0, 1, 5 and 6, that is, P={0, 1, 5, 6}, and a set Q is formed by a subframe 2, that is, Q={2}. A set M=N−(P+Q)={3, 4, 7, 8, 9}. The subframes in the set P may be configured for a second node to send signals (AL downlink) to a third node. The subframe in the set Q may be configured for the third node to send signals (AL uplink) to the second node. In the set P, the subframe 1 or the subframe 6 may be a special subframe, including two spaced parts. The first part has a location and duration corresponding to a DwPTS in a special subframe of a TD-LTE radio frame, and may be configured for the second node to transmit signals to the third node. The second part has a location and duration corresponding to an UpPTS in the special subframe of the TD-LTE radio frame, may be configured for the third node to send signals to the second node, and may further be configured for a first node to send related configuration information, for example, information of a U-V configuration, to the second node.

The above content descriptions do not exclude the following conditions: (1) the first node may send signals to the third node on the subframes in the set P; and (2) the third node may send signals to the first node on the subframe of the set Q.

As shown in FIG. 5(A), when the second node (node 2) sends data to the third node (node 3) on the subframes of the set P, the first node (node 1) may also send data to the third node (node 3) on the same subframes or the other subframes of the set P. As shown in FIG. 5(B), when the third node (node 3) sends the data to the second node (node 2) on the subframe of the set Q, the first node (node 1) may also receive the data at the same time. In addition, the third node may send different data to the first node and the second node on the subframe of the set Q. Data may be transmitted between different wireless links in a time division, frequency division or space division manner, and related nodes may negotiate through signaling. FIG. 5(C) shows a configuration condition of the set N.

Configuration conditions of the set P and the set Q, i.e. information (or called as signaling) of a P-Q configuration, may be determined by the first node and notified to the second node and/or the third node through signaling. Configuration conditions of the set P and the set Q may also be notified to the second node through signaling after being determined by the first node, and then may be notified to the third node by the second node. The signaling may be born in high-layer signaling for sending to implement semi-static configuration, and a sending interval may exceed 100 milliseconds. The information of the P-Q configuration may be an index, defined by a system, of the P-Q configuration (or called as a P-Q reference configuration), and the P-Q configuration may define the subframes included in the set P and the set Q; or, the information of the P-Q configuration may also be subframe indexes of the set P and the set Q.

The set M may include:

(1) a "subframe set U configured for the first node to send signals to the second node"; and/or, (2) a "subframe set V configured for the second node to send signals to the first node"; and/or, (3) a subframe set S configured for the second node to send signals to the third node and for the third node to send signals to the second node.

However, the above descriptions do not exclude the following conditions:

(1) the first node may send signals to the third node or another node on subframes of the set U;

(2) the third node may send signals to the first node on subframes of the set V;

(3) the first node may send signals to the third node on subframes of the set S; and (4) the third node may send signals to the first node on the subframes of the set S.

Figure 6A:
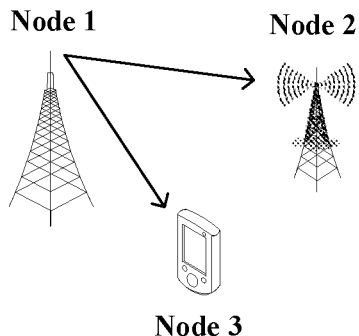
FIG. 6(A), FIG. 6(B), FIG. 6(C), FIG. 6(D) and FIG. 6(E) are schematic diagrams of signal sending directions of subframes in sets U&V&S according to a second application example of the present disclosure.

As shown in FIG. 6(A), when the first node (node 1) sends data to the second node (node 2) on the subframes of the set U, the third node (node 3) may also receive the data. Or, the first node (node 1) may send different data to the third node (node 3) or the second node (node 2) at the same time on the subframes of the set U.

Figure 6B:
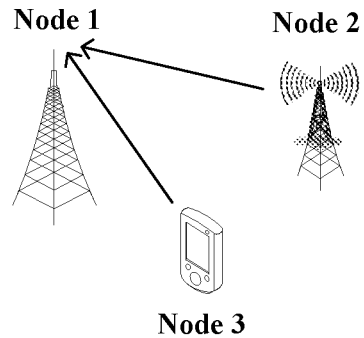

As shown in FIG. 6(B), when the second node (node 2) sends data to the first node (node 1) on the subframes of the set V, the third node (node 3) may also send data to the first node (node 1) on the same subframes or different subframes of the set V.

Figure 6C:
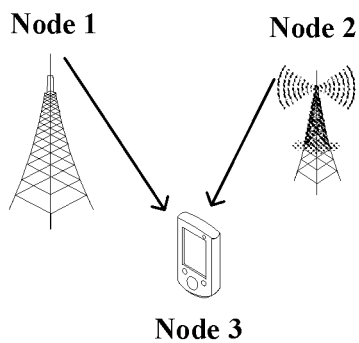

As shown in FIG. 6(C), when the third node receives the data on the subframes of the set S, the first node (node 1) and the second node (2) may both send the data to the third node (node 3) by virtue of the subframes.

Figure 6D:
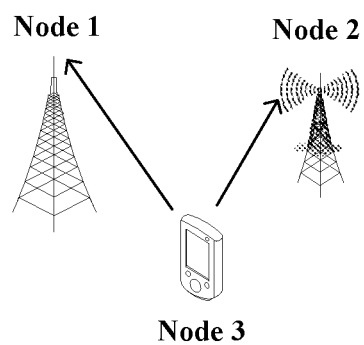
Figure 6E:

As shown in FIG. 6(D), when the third node (node 3) sends data on the subframes of the set S, the first node (node 1) and the second node (node 2) may both receive the data sent by the third node (node 3) on the subframes.

Third Application Example

Figure 7:
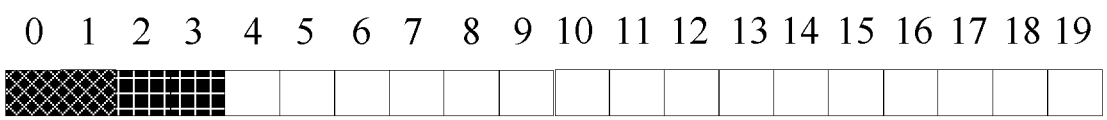
FIG. 7 is a schematic diagram of sets P&Q&M according to a third application example of the present disclosure.

A time window (i.e. a set N) of the application example is formed by 20 subframes (which may also be expressed with as time slots and TTIs as resource units). The 20 subframes may belong to a frequency carrier of a TDD system, and may also belong to an uplink or downlink carrier frequency of an FDD system (each of an uplink carrier frequency and downlink carrier frequency of the FDD system may be considered as a carrier frequency of the TDD system). As shown in FIG. 7, N={0, 1, 2, 3, 4, 5, 6, 7, 8, 9, 10, 11, 12, 13, 14, 15, 16, 17, 18, 19}.

As shown in FIG. 7, it is set that a set P is formed by the subframes 0 and 1, that is, P={01,}, and a set Q={2, 3}. A set M=N−(P+Q)]{4, 5, 6, 7, 8, 9, 10, 11, 12, 13, 14, 15, 16, 17, 18, 19}. The subframes in the set P may be configured for a second node to send signals (AL downlink) to a third node. The subframes in the set Q may be configured for the third node to send signals (AL uplink) to the second node.

The set M may include:

(1) a "subframe set U configured for a first node to send signals to the second node"; and/or, (2) a "subframe set V configured for the second node to send signals to the first node"; and/or, (3) a subframe set W for the second node to send signals to the third node; and/or, (4) a subframe set Z for the third node to send signals to the second node.

The set W and the set Z may be determined by scheduling.

Fourth application example A time window (a set N) of the application example is one radio frame, and uses a TD-LTE frame structure. The set N includes 10 subframes of a radio frame, that is, N={0, 1, 2, 3, 4, 5, 6, 7, 8, 9}. A set P={0, 1, 5, 6}, and a set Q={2}. A set M=N−(P+Q)={3, 4, 7, 8, 9}. A first node may select subframes from the set M to form a set U and/or a set V. Three possible selection manners may be listed below.

Figure 8:
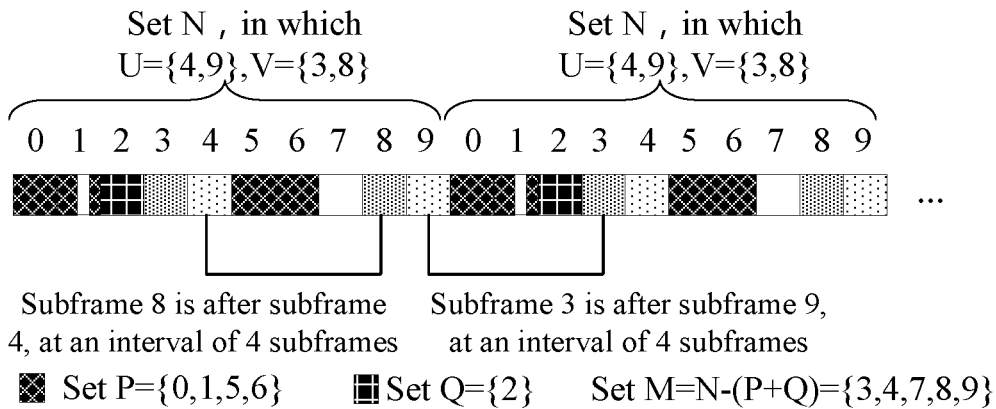
FIG. 8 is a schematic diagram of implicit determination of sets U&V according to a fourth application example of the present disclosure.

As shown in FIG. 8, the subframe 4 and the subframe 9 may be selected from the set M as subframes for the first node to send signals to a second node (that is, U={4, 9}), and the set V may be implicitly determined. An implicit determination rule may be that "the subframe belongs to the set M and each subframe in the set U corresponds to a subframe in the set V; and the subframes in the set U are prior to the corresponding subframes in the set V, and the interval is a minimum value of more than or equal to 4 (subframes)", so that V={8, 3}.

Figure 9:
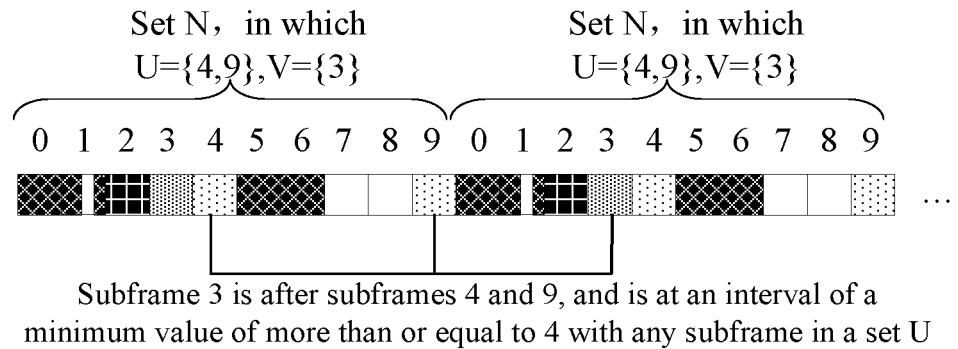
FIG. 9 is another schematic diagram of implicit determination of set U&V according to a fourth application example of the present disclosure.

As shown in FIG. 9, the subframe 4 and the subframe 9 may be selected from the set M as the subframes for the first node to send signals to the second node (that is, U={4, 9}), and the set V may be implicitly determined. An implicit determination rule is that "it belongs to the set M, the set V is formed by one subframe, the subframe is after any subframe in the set U, and the interval is a minimum value of more than or equal to 4 (subframes)", so that V={3}.

The subframe 9 may be selected from the set M as a subframe for the first node to send signals to the second node (that is, U={9}), and the subframe 4 may be selected as a subframe for the second node to send signals to the first node (that is, V={4}).

Configurations of the set U and the set V may be determined by the first node, and information of a U-V configuration may be sent to the second node and/or a third node through signaling born by physical control channel, so as to implement dynamic configuration. A signaling interval may be smaller than or equal to 10 milliseconds. For example, configuration signaling of the set U and the set V may be 3 bits, and its meaning is shown in Table 2.

TABLE 2

| | Examples of Configuration Signaling of Set U/V | |
|---|---|---|
| Signaling value | Meaning | Notes |
| 000 | U = {4, 9} | V = {3, 8} is implicitly notified |
| 001 | U = {4} | V = {8} is implicitly notified |
| 010 | U = {4, 7, 8, 9}, V = {3} | U and V are explicitly notified |
| 011 | U = {3}, V = {7, 8, 9} | U and V are explicitly notified |
| 100 | U = V = { } | U and V include no subframes |

Information of the U-V configuration may also indicate the specific subframes belonging to the set U and specific subframes belonging to the set V in the set M in a bit mapping manner. Signaling overhead is related to the number of units in the set M. For example, M={3, 4, 7, 8, 9}, the configuration of the set U may be notified through 5 bits, and the configuration of the set V may be notified through 5 bits. Signaling A 00001 represents U={9}, and signaling B 10000 represents V={3}.

Figure 10:
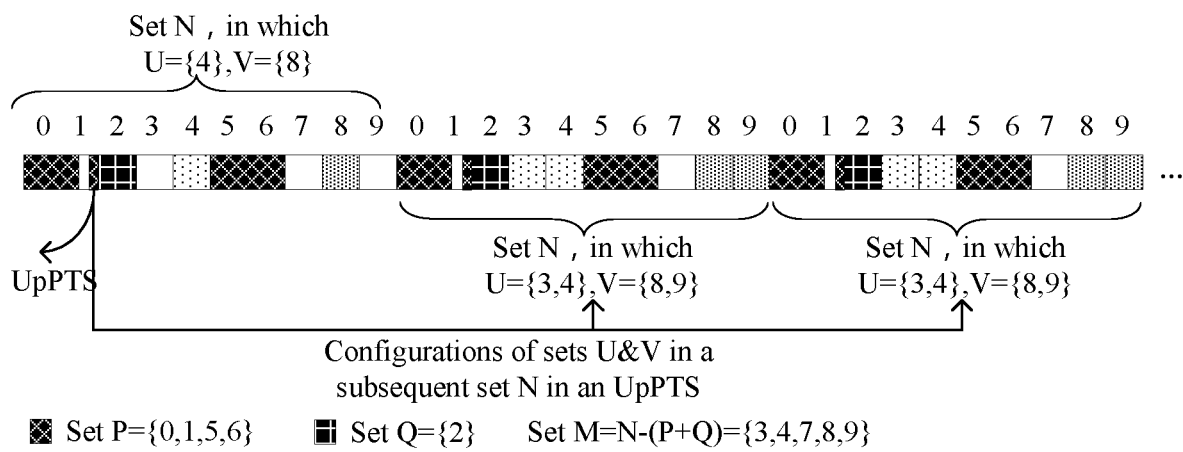
FIG. 10 is a schematic diagram of transmitting information of a U-V configuration through an UpPTS according to a fourth application example of the present disclosure.

As shown in FIG. 10, the information of the U-V configuration may be born on an UpPTS of the subframe 1 and/or the subframe 6. That is, the first node may send U-V configuration signaling to the second node on the UpPTS of the subframe 1 and/or the subframe 6 to notify a subsequent configuration condition of the sets U&V. The UpPTS is very short and cannot be configured to transmit data, so that few radio resources are consumed by AL and BL resource configuration signaling, a large number of radio resources may be configured to transmit data of an AL and/or a BL, and system throughput may be effectively improved.

Fifth Application Example

Subframes in a set S=M−(U+V) may be flexibly configured for a second node to send signals to a third node, or for the third node to send signals to the second node. There made such a hypothesis that a time window (a set N) is one radio frame and uses a TD-LTE frame structure. The set N includes 10 subframes of one radio frame, that is, N={0, 1, 2, 3, 4, 5, 6, 7, 8, 9}. A set P={0, 1, 5, 6} and a Q={2}. A set M=N−(P+Q)={3, 4, 7, 8, 9}. Subframes may be selected from the set M to form sets U={9} and V={3}.

If a configuration condition of a set S is not notified to the third node (for example, only information of a P-Q configuration is notified, information of a U-V configuration is not notified, and units of the set S may be obtained according to the P-Q configuration and the U-V configuration), the third node may perform blind detection to determine whether each subframe sends downlink scheduling signaling for the third node or not on the current subframe of the set M. If the downlink scheduling signaling is detected, the third node may judge that the current subframe is configured for the second node or a first node to send a signal to the third node, and then the third node may receive data belonging to the third node on the subframe according to the downlink scheduling signaling. The subframe in the set Q may be fixedly configured for the third node to send signals to the first node or the second node, so that an ACK/NACK feedback of the data sent to the third node by first node or the second node (including data sent in the subframes of the set P and the set S) may be sent on the subframe in the set Q. If the configuration condition of the set S is notified to the third node, the third node is only required to perform blind detection on the subframes of the set S (it is unnecessary to perform blind detection on the subframes corresponding to the set U and the set V). However, in another example, the second node may also send data to the third node on the set V (for example, when the second node is not required to send data to the first node), the third node may also may perform blind detection on the subframe corresponding to the set V at this moment to judge whether there is data sent to the third node by the second node or not.

Figure 11:
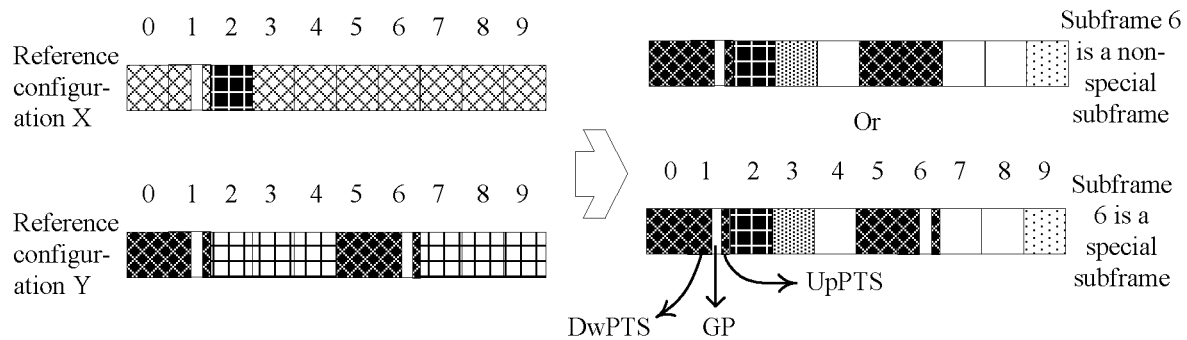
FIG. 11 is a schematic diagram of a reference configuration and a configuration of a corresponding set N according to a fifth application example of the present disclosure.

An ACK/NACK signal of downlink data sent to the third node by the first node and/or the second node on the set P and the set M may be sent on the subframe of the set Q. A timing relationship between the downlink data and its ACK/NACK may be the same as a downlink data HARQ timing relationship defined by a reference configuration X (FIG. 11). In the subframe configuration X, except the subframe {2} corresponding to the set Q is an uplink subframe, the other subframes are all downlink subframes. For this example, the reference subframe configuration X may be a D/U configuration 5 in Table 1. The downlink HARQ timing relationship defines the specific subframe in which an ACK/NACK signal of downlink data sent in a subframe is fed back.

ACK/NACK signals of uplink data sent to the second node and/or the first node by the third node on the set Q and the set M may be sent on the subframes of the set P. A timing relationship between the uplink data and its ACK/NACK feedbacks and/or uplink scheduling signaling may be the same as an uplink data HARQ timing relationship of a reference configuration Y (FIG. 11). In the reference configuration Y, except the subframes {0, 1, 5, 6} corresponding (corresponding in location) to the set P are downlink subframes, the other subframes are all uplink subframes. In the example, the reference configuration Y may be a D/U configuration 0 in Table 1. The uplink data HARQ timing relationship defines the specific subframe in which an ACK/NACK signal of uplink data sent in a subframe is fed back.

The subframes of the set Q and the set P in the right two figures in FIG. 11 may correspond to the uplink subframes of the reference configuration X and the downlink subframes of the reference configuration Y respectively, and the subframe 6 may be a special subframe, and may also be a nonspecial subframe.

The third node may detect scheduling signaling in the subframes of the set P. The scheduling signaling may include downlink scheduling signaling for the data sent to the third node by the second node and/or the first node in the set P, and may also include uplink scheduling signaling for the data sent to the second node and/or the first node by the third node in the set Q and/or the set M.

The subframes in the set P may be configured for the second node and/or the first node to send measurement pilots to the third node, and the subframe in the set Q may be configured for the third node to send the measurement pilots to the second node and/or the first node.

Sixth Application Example

Figure 12:
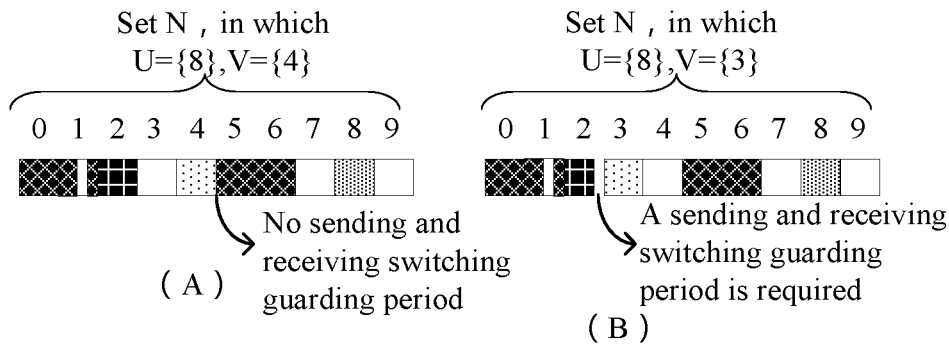
FIG. 12 is a schematic diagram of a receiving and sending switching interval according to a sixth application example of the present disclosure.
Figure 12:
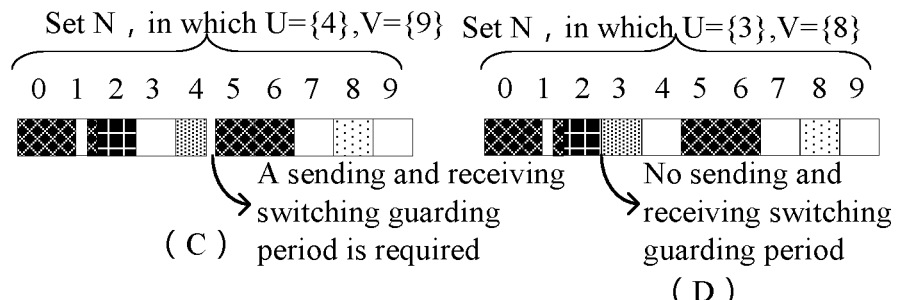

For a second node, when subframes of a set V and a set P (or subframes configured for the second transmission node to send signals to a third transmission node in a set S) are adjacent, no sending and receiving switching guarding period may not be required (as shown in FIG. 12(A)). When subframes of the set V and a set Q (or subframes configured for the third transmission node to send signals to the second transmission node in the set S) are adjacent, the sending and receiving switching guarding period may be required (as shown in FIG. 12(B)). When subframes of a set U and the set P (or the subframes configured for the second transmission node to send signals to the third transmission node in the set S) are adjacent, the sending and receiving switching guarding period may be required (as shown in FIG. 12(C)). When the subframes of the set U and the set Q (or the subframes configured for the second transmission node to send signals to the second transmission node in the set S) are adjacent, no sending and receiving switching guarding period may be required (as shown in FIG. 12(D)). The same applies for other nodes.

In the solution, the link between the first node and the second node is the sBL, and uses the subframes in the sets U&V, and the link between the first node or the second node and the third node is the AL. Resources used by the AL include the subframes of the sets P&Q&S (=M−U−V). Data transmission related control signaling of the third node (for example, resource allocation and scheduling signaling and ACK/NACK feedback signaling corresponding to data transmission) and measurement pilot signals of the first node or the second node may be sent in the subframes of the sets P&Q. Therefore, the subframes in the set M=N−(P+Q) may be flexibly allocated to each link, and influence on data transmission (receiving/sending) of the terminal and measurement over the transmission nodes may be eliminated. The subframes of the sets U&V belong to the set M, so that the configurations of the sets U&V may be flexibly and rapidly regulated without influence data transmission of the terminal and measurement over the transmission nodes. Therefore, a purpose of flexibly and rapidly allocating sBL/AL resources may be achieved.

In addition, the solution may widen resource allocation range of the sBL/AL, and all the resources may even be rapidly allocated to the AL. When data accessed by the terminal has been cached in the second node, a data rate of the AL may be rapidly increased. For example, the UpPTSs are allocated to the sBL, and the second node may monitor a resource allocation condition (for example, configurations of the sets U&V) of the sBL/AL on the second part (corresponding UpPTSs) of the special subframes of the set P. Each UpPTS occupies few resources (at most two symbols), so that the AL resource allocation range may be maximally enlarged, and almost all the radio resources may be allocated to the AL.

Measurement of the terminal over an access node may be completed on the subframes in the set P, and no CRSs of the AL and unnecessary control channels (for example, a PCFICH) are required to be transmitted on the first one or two OFDM symbols of a subframe of an sBL, like a TD-LTE R10 relay. Therefore, all the resources of the subframe of the an sBL may be configured to transmit sBL signals, and the resource utilization efficiency may be improved.

After the solutions are adopted, the sBL may use a channel structure (for example, a PDCCH) completely the same as the AL, and is not required to additionally support an R-PDCCH like the relay. Therefore, implementation complexity of equipment may be reduced, and unified design of the sBL and the AL may be implemented.

By using the solutions, an uplink and downlink resource proportion of the sBL or the AL may be rapidly and dynamically regulated. Moreover, an uplink and downlink resource proportion regulation space may be larger. For example, an AL of a current relay cannot support a D/U configuration 5 (as shown in Table 5). After the solutions are used, after all the resources are rapidly allocated to the AL, the first node or the second node may dynamically regulate the uplink and downlink proportion of the AL, so as to support the D/U configuration 5 of TD-LTE.

By using the solutions, the uplink subframe of the sBL may achieve higher utilization efficiency. For example: for a subframe not in the sets U and V, if the subframe is not configured for the first node to send data to the second node or for the second node to send data to the first node in a practical transmission process, the first node or the second node may still dynamically allocate the subframe in the sets U&V to the AL (the terminal may perform scheduling signaling blind detection on all the subframes of the set M).

In addition, an embodiment of the present disclosure provides a computer-readable storage medium, which stores a computer-executable instruction. The computer-executable instruction may be executed to implement the above-mentioned configuration method for resource sharing of the multiple wireless links.

In addition, an embodiment of the present disclosure provides a computer-readable storage medium, which stores a computer-executable instruction. The computer-executable instruction may be executed to implement a signal transmission method applied to a first node.

In addition, an embodiment of the present disclosure provides a computer-readable storage medium, which stores a computer-executable instruction. The computer-executable instruction may be executed to implement a signal transmission method applied to a second node.

In addition, an embodiment of the present disclosure provides a computer-readable storage medium, which stores a computer-executable instruction. The computer-executable instruction may be executed to implement a signal transmission method applied to a third node.

Sequence numbers of the embodiments of the present disclosure are only adopted for description and not intended to represent quality of the embodiments. From the above descriptions about the implementation modes, those skilled in the art may clearly know that the methods of the embodiments may be implemented in a manner of combining software and a necessary universal hardware platform, for example, is implemented by instructing related hardware through a program, and of course, may also be implemented through hardware, but the former is a better implementation mode under many circumstances. Based on such an understanding, the technical solutions of the embodiments of the present disclosure substantially or parts making contributions to a conventional part may be embodied in form of software product, and the computer software product is stored in a storage medium (for example, a Read-Only Memory (ROM)/Random Access Memory (RAM), a magnetic disk and an optical disk), including a plurality of instructions configured to enable terminal equipment (which may be a mobile phone, a computer, a server, network equipment or the like) to execute the method of each embodiment of the application.

In an exemplary embodiment, all or part of the acts in the embodiments may also be implemented by virtue of one or more integrated circuits. Correspondingly, each module/unit in the embodiments may be implemented in form of hardware, for example, corresponding functions are realized through an integrated circuit. They may also be implemented in form of software function module, for example, the corresponding functions are realized by executing programs/instructions stored in a memory by a processor. The application is not limited to a hardware and software combination in any specific form.

The above is only the preferred embodiment of the application and not thus intended to limit the patent scope of the application. Any equivalent structure or equivalent flow transformation made by virtue of the contents of the specification and drawings of the application or direct or indirect application to other related technical fields shall fall within the scope of protection of the application.

INDUSTRIAL APPLICABILITY

Some embodiments of the present disclosure provide a configuration method for resource sharing among multiple wireless links, a signal transmission method and a node, which have at least one of the following beneficial effects. Flexible and rapid resource allocation of the multiple wireless links such as the sBL and the AL may be supported. A resource allocation range, for example, resource allocation ranges of the sBL and the AL, may be widened, and almost all resources may even be allocated to the AL. All resources of the second link, for example, the sBL, may be configured to transmit sBL signals, so that utilization efficiency of the resources may be improved. The second link, for example, the sBL, may use a channel structure (for example, a PDCCH) completely the same as another link, for example, the AL, and is not required to additionally support an R-PDCCH like a relay, so that implementation complexity of equipment may be reduced, and unified design of the sBL and the AL may be implemented. A resource proportion of the multiple wireless links, for example, the sBL and the AL, may be rapidly and dynamically regulated, and an uplink and downlink resource proportion regulation space may be larger. Higher utilization efficiency of uplink resources of the second link, for example, the sBL, may be achieved.

What is claimed is:

1. A configuration method for resource sharing among multiple wireless links, the multiple wireless links comprising a first link and a second link, or comprising a first link, a second link and a third link,
wherein the method comprising:
performing P-Q configuration on a set N formed by a group of continuous units, and determining a set P configured for downlink transmission of the second link and a set Q configured for uplink transmission of the second link in the set N; performing
U-V configuration on the set N, and determining a set U configured for downlink transmission of the first link and a set V configured for uplink transmission of the first link in the set N; and
determining a set S for uplink transmission of the second link and downlink transmission of the second link; or, the method comprising: performing P-Q configuration on a set N formed by a group of continuous units, and determining a set P configured for downlink transmission of the third link and a set Q configured for uplink transmission of the third link in the set N; performing U-V configuration on the set N, and determining a set U configured for downlink transmission of the third link and a set V configured for uplink transmission of the third link in the set N; and determining a set S for uplink transmission of the third link and downlink transmission of the third link;
wherein the units are time units, the set P and the set Q are not intersected, the set U and the set V are not intersected and both belong to a set M, where the set M=N−(P+Q), and the set S=M−(U+V),
wherein the first link is a link between a first node and a second node; the second link is a link between the second node and a third node; the third link is a link between the first node and the third node; and directions from the first node to the second node and the third node and from the second node to the third node are downlink directions of corresponding links, and opposite directions of the downlink directions are uplink directions of the corresponding links.

2. The method as claimed in claim 1, wherein
a number of units and a duration of each unit in the set N are the same as a number of units and a duration of each unit in one or more Time Division-Long Term Evolution (TD-LTE) radio frames;
or,
the set N is a resource set on a minimum resource configuration period; and whether units in the set S are used for uplink transmission or downlink transmission is determined by scheduling;
or,
PDCCH or PDSCH is used for downlink transmission of the multiple wireless links; and PUCCH or PUSCH used for corresponding uplink transmission;
or,
the first node is a donor Transmission Point (dTP), the second node is a relay Transmission Point (rTP), and the third node is a terminal; and the first link is a self-Backhaul Link (sBL) between the dTP and the rTP, the second link is an Access Link (AL) between the rTP and the terminal, and the third link is an AL between the dTP and the terminal.

3. The method as claimed in claim 1, wherein
the set P comprises one or more special units, each special unit comprises a first part and a second part, and a guarding period is set between the first part and the second part.

4. The method as claimed in claim 1, wherein
units of the set P correspond to downlink units defined by a reference configuration Y; and, units of the set Q correspond to uplink units defined by a reference configuration X, wherein the reference configuration X and the reference configuration Y are uplink and downlink configurations, a number of units of the reference configuration X and a number of units of the reference configuration Y are both the same as a number of units in the set N, a number of downlink units in the reference configuration X is more than a number of the uplink units, and a number of uplink units in the reference configuration Y is more than a number of the downlink units;
or,
a timing relationship between downlink data transmitted on the second link/third link and an Acknowledgement (ACK)/Negative Acknowledgement (NACK) signal of the downlink data is the same as a downlink data Hybrid Automatic Repeat Request (HARQ) timing relationship defined by a reference configuration X; and, a timing relationship between uplink data transmitted on the second link/third link and an ACK/NACK signal of the uplink data is the same as an uplink data HARQ timing relationship defined by a reference configuration Y, wherein the reference configuration X and the reference configuration Y are both the same as a number of units in the set N, units corresponding to units in the set Q in the reference configuration X are configured for uplink transmission, and the other units in the reference configuration X are all configured for downlink transmission; and units corresponding to units in the set P in the reference configuration Y are configured for downlink transmission, and the other units in the reference configuration Y are all configured for uplink transmission.

5. The method as claimed in claim 1, wherein
units in the set V and units in the set U meet the following mapping rules:
the units in the set U are in one to one correspondence with the units in the set V, and a corresponding unit, in the set V, of each unit in the set U is a unit, after the unit in the set U, at a smallest interval in units, which are in the set M, at intervals of more than or equal to 4 with the unit in the set U; or,
the set V is formed by one unit, and the unit in the set V is a unit, after any unit in the set U, at a smallest interval in units, which are in the set M, at intervals of more than or equal to 4 with the last unit in the set U.

6. The method as claimed in claim 1, wherein
the method is applied to a communication system;
in an optional P-Q configuration of the communication system, the set P and the set Q are both non-empty, and a sum of a number of units in the set P and a number of units in the set Q is smaller than a number of units in the set N;
in an optional U-V configuration of the communication system, the set U and the set V follow one or more configuration types as follows:
the set U is non-empty, and the set V is non-empty;
the set U is non-empty, and the set V is empty;
the set U is empty, and the set V is non-empty; and
the set U is empty, and the set V is empty.

7. The method as claimed in claim 1, wherein
performing P-Q configuration on the set N comprises:
performing, by the first node or the second node or another node in a communication system, P-Q configuration on the set N, and transferring information of the P-Q configuration to enable all of the first node, the second node and the third node to acquire the P-Q configuration;
or,
performing U-V configuration on the set N comprises:
performing, by the first node or the second node or another node in a communication system, U-V configuration on the set N, and transferring information of the U-V configuration to enable both the first node and the second node or all of the first node, the second node and the third node to acquire the information of the U-V configuration.

8. A signal transmission method, applied to a first node, the first node performing signal transmission on a basis of a resource configuration determined by the method as claimed in claim 1, the signal transmission method comprising:
sending signals to a second node on units of a set U; and
receiving, on units of a set V, signals sent by the second node.

9. The method as claimed in claim 8, wherein
a third link exists between the first node and a third node, and one or more of the following signal transmission is performed between the first node and the third node:
sending signals to the third node on units of a set P;
receiving, on units of a set Q, signals sent by the third node;
sending signals to the third node on units of the set U;
receiving, on units of the set V, signals sent by the third node; and
sending signals to the third node on units of a set S and/or receiving, on units of a set S, signals sent by the third node.

10. The method as claimed in claim 8, wherein
the signals sent to the second node by the first node comprise information of a P-Q configuration; or, the signals sent to the second node by the first node comprise the information of the P-Q configuration, and signals sent to the third node by a first node comprise the information of the P-Q configuration; or, the signals received by the first node from the second node comprise the information of the P-Q configuration;
or,
the signals sent to the second node by the first node comprise information of a U-V configuration; or, the signals sent to the second node by the first node comprise the information of the U-V configuration, and signals sent to the third node by a first node comprise the information of the U-V configuration; or, the signals received by the first node from the second node comprise the information of the U-V configuration;
or,
signals sent to the third node by a first node on units of a set P comprise measurement pilots; and signals received by the first node from the third node on units of a set Q comprise the measurement pilots;
or,
signals sent to the third node by a first node on units of a set P comprise: uplink scheduling signaling indicating resources for sending data to the first node by a third node on units of one or more sets in a set Q, the set V and a set S.

11. A signal transmission method, applied to a second node, the second node performing signal transmission on a basis of a resource configuration determined by the method as claimed in claim 1, the signal transmission method comprising:
sending signals to a third node on units of a set P;
receiving, on units of a set Q, signals sent by the third node;
receiving, on units of a set U, signals sent by a first node;
sending signals to the first node on units of a set V; and
sending signals to the third node on units of a set S and/or receiving, on units of a set S, signals sent by the third node.

12. The method as claimed in claim 11, wherein
the signals sent to the third node by the second node on the units of the set P comprise all Acknowledgement (ACK)/Negative Acknowledgement (NACK) signals of data sent to the second node by the third node; and the signals received by the second node from the third node on the units of the set Q comprise all ACK/NACK signals of data sent to the third node by the second node;
or,
the signals received by the second node from the first node comprise information of a P-Q configuration; or, the signals received by the second node from the first node comprise the information of the P-Q configuration, and the signals sent to the third node by the second node comprise the information of the P-Q configuration; or, the signals sent to the first node by the second node comprise the information of the P-Q configuration, and the signals sent to the third node by the second node comprise the information of the P-Q configuration;
or,
the signals received by the second node from the first node comprise information of a U-V configuration; or, the signals received by the second node from the first node comprise the information of the U-V configuration, and the signals sent to the third node by the second node comprise the information of the U-V configuration; or, the signals sent to the first node by the second node comprise the information of the U-V configuration; or, the signals sent to the first node by the second node comprise the information of the U-V configuration, and the signals sent to the third signal by the second node comprise the information of the U-V configuration;
or,
the signals sent to the third node by the second node on the units of the set P comprise measurement pilots; and the signals received by the second node from the third node on the units of the set Q comprise the measurement pilots;
or,
the signals sent to the third node by the second node on the units of the set P comprise: uplink scheduling signaling indicating resources for sending data to the second node by the third node on units of the set Q and the set S.

13. The method as claimed in claim 12, wherein
the second node receives the information of the U-V configuration from the first node on units of the set P;
the second node sends the information of the U-V configuration to the third node on units of the set P; and
the second node sends the information of the U-V configuration to the first node on units of the set V.

14. The method as claimed in claim 11, further comprising: sending, by the second node, signals to the third node on units of the set V.

15. A signal transmission method, applied to a third node, the third node performing signal transmission on a basis of a resource configuration determined by the method as claimed in claim 1, the signal transmission method comprising:
receiving, on units of a set P, signals sent by a second node;
sending signals to the second node on units of a set Q; and
receiving, on units of a set S, signals sent by the second node and/or sending signals to the second node on units of a set S.

16. The method as claimed in claim 15, wherein
a third link exists between the third node and a first node, and the third node further performs one or more of the following signal transmission:
receiving, on units of the set P, signals sent by the first node;
sending signals to the first node on units of the set Q;
receiving, on units of a set U, signals sent by the first node;
sending signals to the first node on units of a set V;
receiving signals sent by the second node on units of the set V; and
receiving, on units of the set S, signals sent by the first node and/or sending signals to the first node on units of the set S;
or,
the signals received by the third node from the second node/first node on the units of the set P comprise all Acknowledgement (ACK)/Negative Acknowledgement (NACK) signals of data sent to the second node/first node by the third node; and the signals sent to the second node/first node by the third node on the units of the set Q comprise all ACK/NACK signals of data sent to the third node by the second node/first node.

17. The method as claimed in claim 15, wherein
the signals received by the third node from the first node comprise information of a P-Q configuration; and/or, the signals received by the third node from the second node comprise the information of the P-Q configuration;
or,
the signals received by the third node from the first node comprise information of a U-V configuration; and/or, the signals received by the third node from the second node comprise the information of the U-V configuration;
or,
the signals received by the third node from the second node/first node on the units of the set P comprise measurement pilots; and the signals sent to the second node/first node by the third node on the units of the set Q comprise the measurement pilots;
or,
the signals received by the third node from the second node on the units of the set P comprise: uplink scheduling signaling indicating resources for sending data to the second node by the third node on units of the set Q and the set S; and/or, the signals received by the third node from the first node on the units of the set P comprise: uplink scheduling signaling indicating resources for sending data to the first node by a third node on units of one or more sets in the set Q, a set V and the set S.

18. The method as claimed in claim 17, wherein
the third node receives the information of the U-V configuration from the first node on units of the set P; and
the third node receives the information of the U-V configuration from the second node on units of the set P.

19. A first node in a communication system, comprising a transmission module, wherein
the transmission module is configured to perform signal transmission on a basis of a resource configuration determined by the method as claimed in claim 1, and further comprises:
a first transmission unit, configured to send signals to a second node on units of a set U; and
a second transmission unit, configured to receive, on units of a set V, signals sent by the second node.

20. A second node in a communication system, comprising a transmission module, wherein
the transmission module is configured to perform signal transmission on a basis of a resource configuration determined by the method as claimed in claim 1, and further comprises:
a first transmission unit, configured to send signals to a third node on units of a set P;
a second transmission unit, configured to receive, on units of a set Q, signals sent by the third node;
a third transmission unit, configured to receive, on units of a set U, signals sent by a first node;
a fourth transmission unit, configured to send signals to the first node on units of a set V; and
a fifth transmission unit, configured to send signals to the third node on units of a set S and/or receive, on units of a set S, signals sent by the third node.

21. A third node in a communication system, comprising a transmission module, wherein
the transmission module is configured to perform signal transmission on a basis of a resource configuration determined by the method as claimed in claim 1, and comprises:
a first transmission unit, configured to receive, on units of a set P, signals sent by a second node;
a second transmission unit, configured to send signals to the second node on units of a set Q; and
a third transmission unit, configured to receive, on units of a set S, signals sent by the second node and/or send signals to the second node on units of the set S.

22. The method as claimed in claim 1, wherein
units of the set P correspond to downlink units defined by a reference configuration Y; or, units of the set Q correspond to uplink units defined by a reference configuration X, wherein the reference configuration X and the reference configuration Y are uplink and downlink configurations, a number of units of the reference configuration X and a number of units of the reference configuration Y are both the same as a number of units in the set N, a number of downlink units in the reference configuration X is more than a number of the uplink units, and a number of uplink units in the reference configuration Y is more than a number of the downlink units;
or,
a timing relationship between downlink data transmitted on the second link/third link and an Acknowledgement (ACK)/Negative Acknowledgement (NACK) signal of the downlink data is the same as a downlink data Hybrid Automatic Repeat Request (HARQ) timing relationship defined by a reference configuration X; or,
a timing relationship between uplink data transmitted on the second link/third link and an ACK/NACK signal of the uplink data is the same as an uplink data HARQ timing relationship defined by a reference configuration Y, wherein the reference configuration X and the reference configuration Y are both the same as a number of units in the set N, units corresponding to units in the set Q in the reference configuration X are configured for uplink transmission, and the other units in the reference configuration X are all configured for downlink transmission; and units corresponding to units in the set P in the reference configuration Y are configured for downlink transmission, and the other units in the reference configuration Y are all configured for uplink transmission.

* * * * *